United States Patent
Kim et al.

(10) Patent No.: US 11,036,367 B2
(45) Date of Patent: Jun. 15, 2021

(54) METHOD FOR CONTROLLING EXTERNAL DEVICE BY ELECTRONIC DEVICE, AND ELECTRONIC DEVICE THEREFOR

(71) Applicant: SAMSUNG ELECTRONICS CO., LTD., Suwon-si (KR)

(72) Inventors: Byoung-oh Kim, Suwon-si (KR); Chul-joo Kim, Suwon-si (KR); Sang-jeong Lee, Suwon-si (KR); Yoon-kyung Lee, Seoul (KR); Dong-yun Jin, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/096,376

(22) PCT Filed: Oct. 20, 2016

(86) PCT No.: PCT/KR2016/011847
§ 371 (c)(1),
(2) Date: Oct. 25, 2018

(87) PCT Pub. No.: WO2017/191875
PCT Pub. Date: Nov. 9, 2017

(65) Prior Publication Data
US 2019/0138172 A1 May 9, 2019

(30) Foreign Application Priority Data
May 4, 2016 (KR) .................. 10-2016-0055769

(51) Int. Cl.
*G06F 3/0484* (2013.01)
*G06F 3/0488* (2013.01)
(Continued)

(52) U.S. Cl.
CPC .......... *G06F 3/0484* (2013.01); *G06F 3/0482* (2013.01); *G06F 3/04883* (2013.01);
(Continued)

(58) Field of Classification Search
CPC .. G06F 3/0484; G06F 9/485; G06F 2209/482; H04L 67/125; G08C 17/02
See application file for complete search history.

(56) References Cited

U.S. PATENT DOCUMENTS

| 7,586,398 B2 | 9/2009 | Huang et al. |
| 7,610,555 B2 | 10/2009 | Klein et al. |

(Continued)

FOREIGN PATENT DOCUMENTS

| KR | 10-2010-0026941 A | 3/2010 |
| KR | 10-2013-0012397 A | 2/2013 |

(Continued)

OTHER PUBLICATIONS

International Search Report (PCT/ISA/210) and Written Opinion (PCT/ISA/237) dated Jan. 24, 2017 issued by the International Searching Authority in International Application No. PCT/KR2016/011847.

*Primary Examiner* — Roland J Casillas
(74) *Attorney, Agent, or Firm* — Sughrue Mion, PLLC

(57) ABSTRACT

Provided is an operation method of an electronic device for controlling an external device, the operation method including: receiving a user input to a user interface provided for controlling the electronic device; determining whether a foreground application is associated with the external device; and, when the foreground application is associated with the external device, transmitting a control signal corresponding to the user input to the external device.

17 Claims, 26 Drawing Sheets

(51) Int. Cl.
*H04L 29/08* (2006.01)
*G06F 3/0482* (2013.01)
*G06F 9/48* (2006.01)
*G08C 17/02* (2006.01)

(52) U.S. Cl.
CPC ............ *G06F 9/485* (2013.01); *G08C 17/02* (2013.01); *H04L 67/125* (2013.01); *G06F 2209/482* (2013.01); *G08C 2201/20* (2013.01); *G08C 2201/21* (2013.01); *G08C 2201/30* (2013.01); *G08C 2201/92* (2013.01); *G08C 2201/93* (2013.01)

(56) References Cited

U.S. PATENT DOCUMENTS

| | | | |
|---|---|---|---|
| RE41,453 E | 7/2010 | Wall et al. | |
| 8,504,008 B1* | 8/2013 | Gossweiler, III | H04M 1/72533 |
| | | | 455/420 |
| 9,167,419 B2 | 10/2015 | Harrison | |
| 9,226,020 B2 | 12/2015 | Kim et al. | |
| 2011/0252373 A1* | 10/2011 | Chaudhri | G06F 3/0482 |
| | | | 715/835 |
| 2013/0005250 A1* | 1/2013 | Kim | G08C 17/02 |
| | | | 455/41.1 |
| 2014/0022192 A1 | 1/2014 | Hatanaka | |
| 2014/0055251 A1* | 2/2014 | Son | G08C 17/02 |
| | | | 340/12.54 |
| 2014/0123190 A1 | 5/2014 | Song et al. | |
| 2015/0113457 A1* | 4/2015 | Li | G06F 9/451 |
| | | | 715/765 |
| 2015/0130596 A1 | 5/2015 | Aginsky et al. | |
| 2015/0154858 A1 | 6/2015 | Arling et al. | |
| 2015/0220075 A1 | 8/2015 | Ziv | |
| 2015/0243161 A1 | 8/2015 | Hayes et al. | |
| 2015/0248200 A1 | 9/2015 | Cho et al. | |
| 2016/0147207 A1 | 5/2016 | Park et al. | |
| 2017/0005825 A1 | 1/2017 | Kim et al. | |

FOREIGN PATENT DOCUMENTS

| | | |
|---|---|---|
| KR | 10-2014-0055794 A | 5/2014 |
| KR | 10-2014-0144504 A | 12/2014 |
| KR | 10-2015-0072885 A | 6/2015 |

* cited by examiner

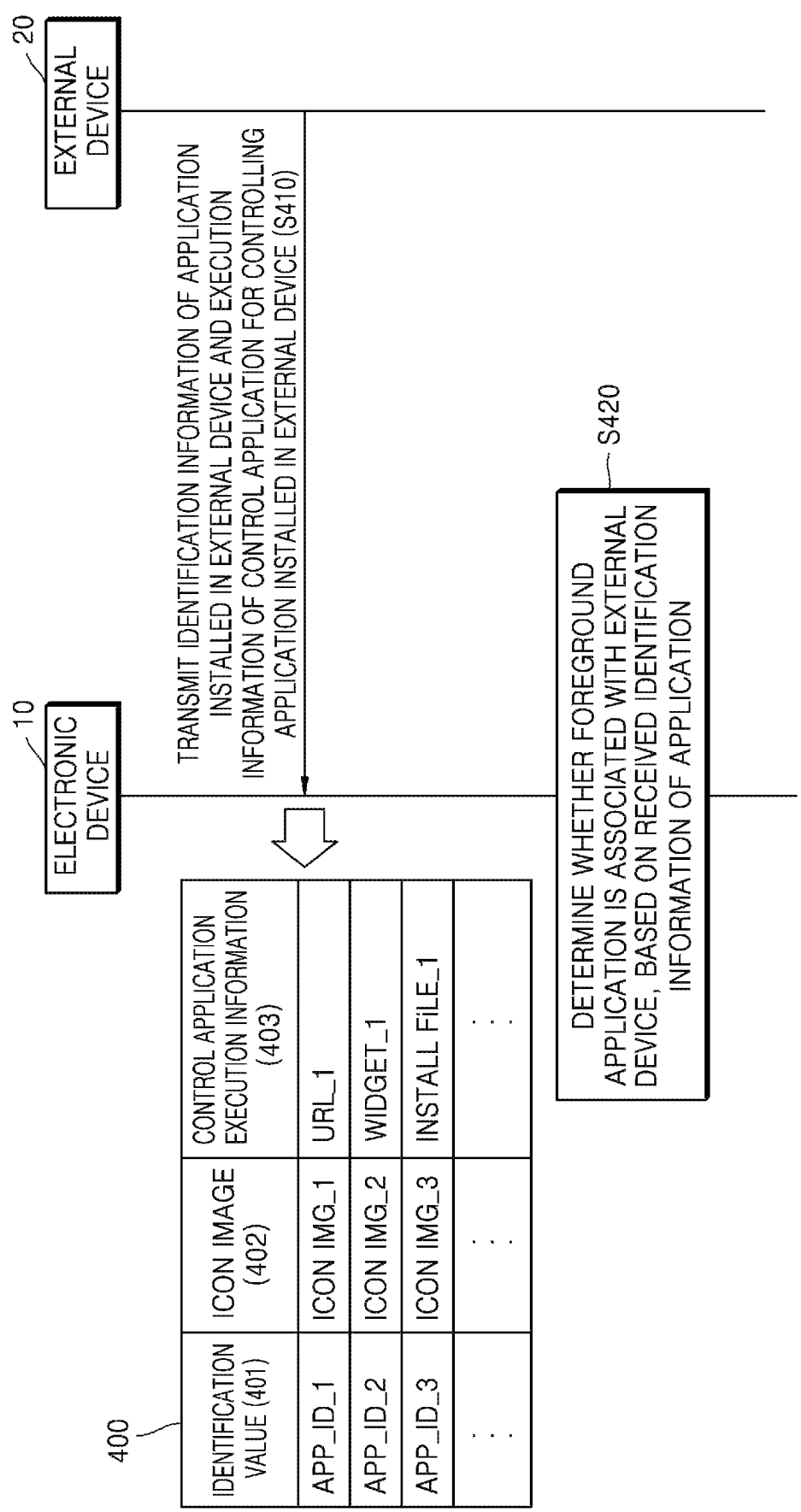

FIG. 9
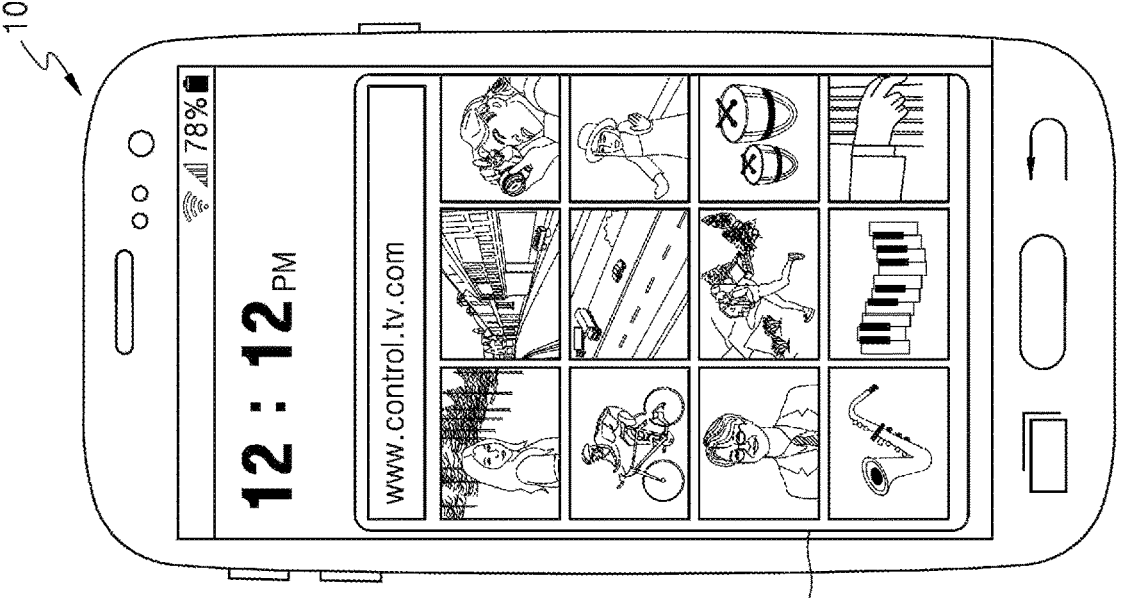
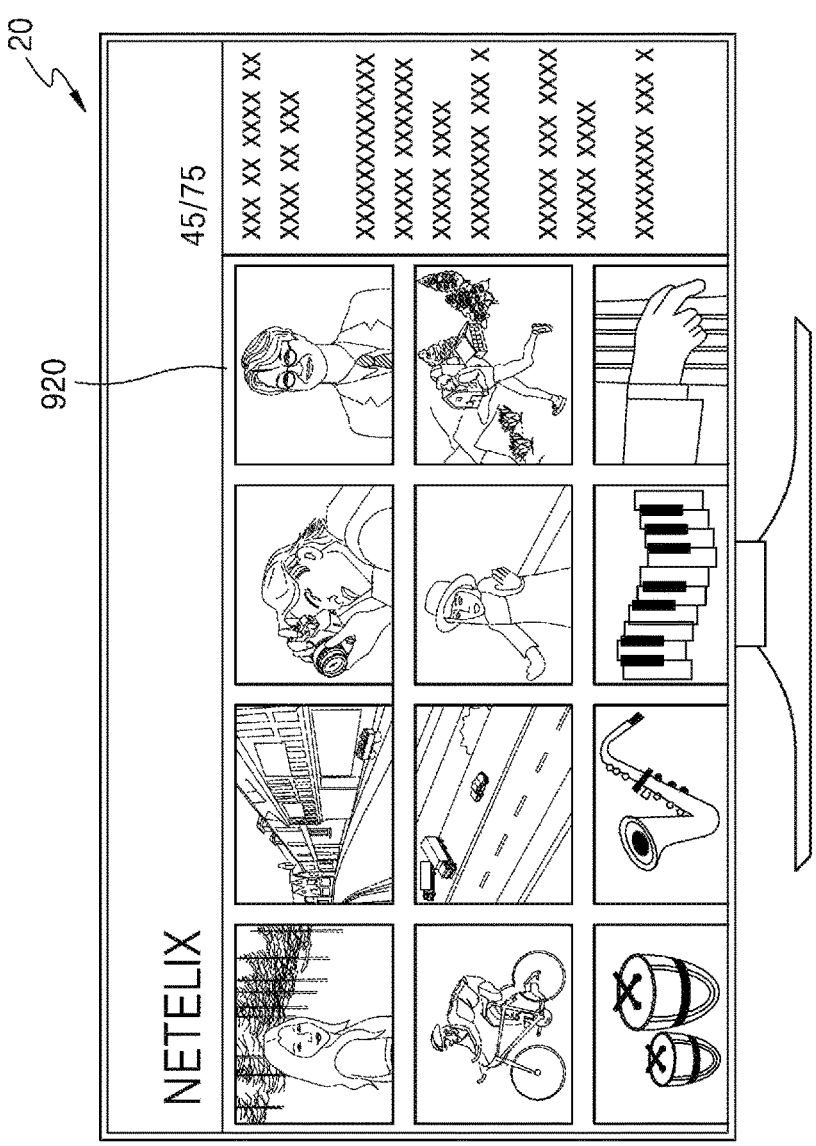

FIG. 20
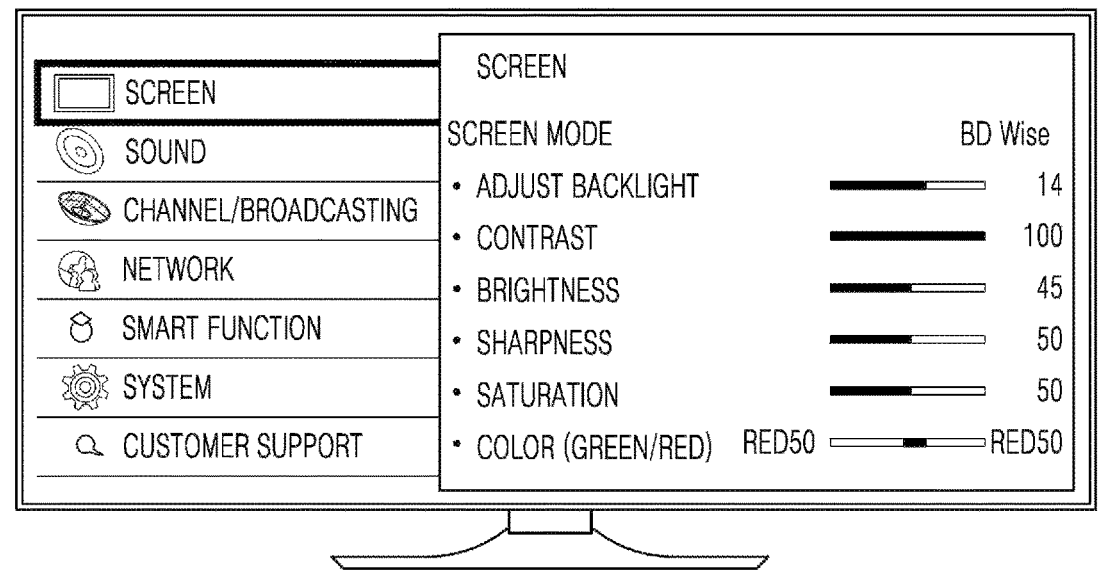
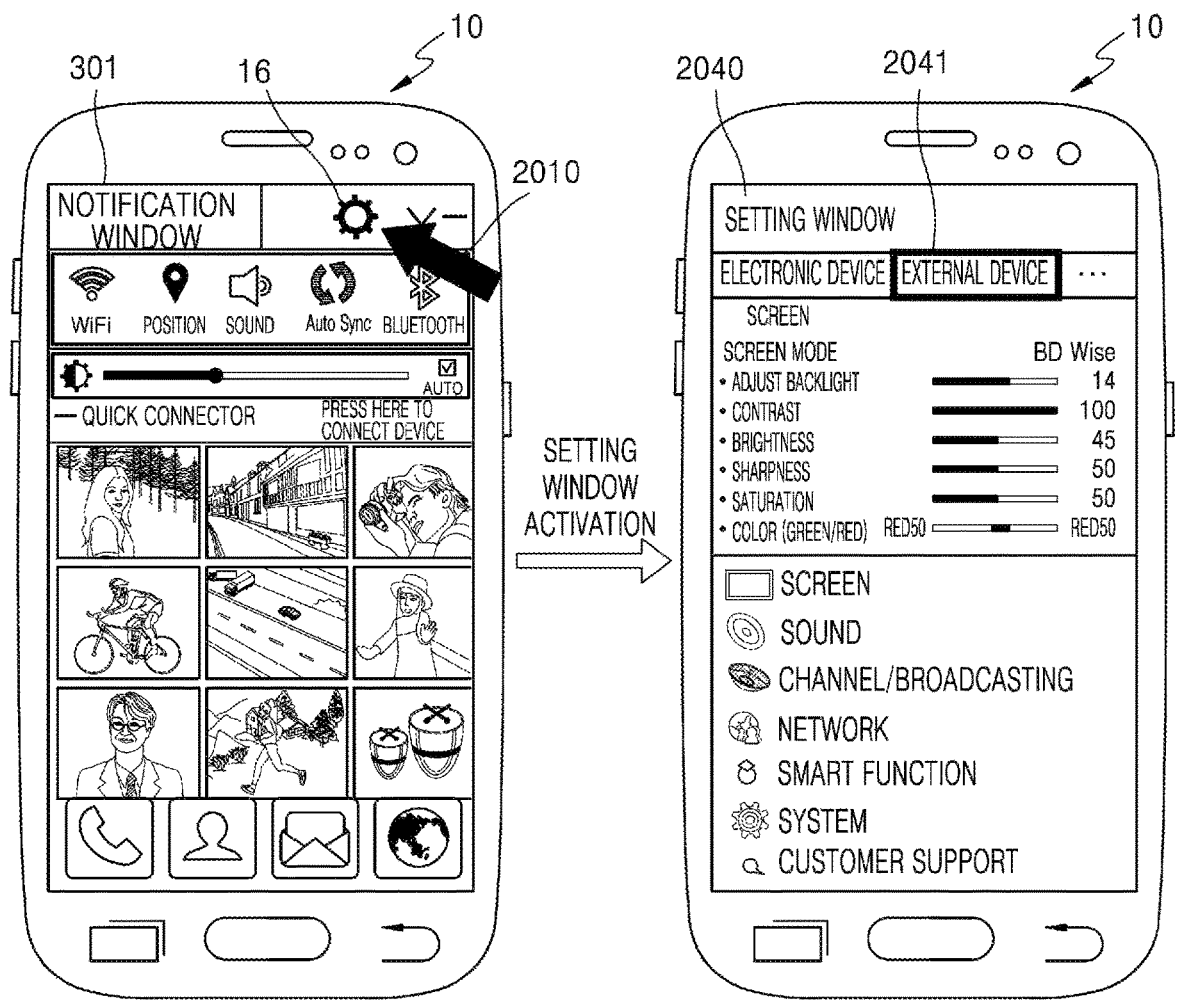

METHOD FOR CONTROLLING EXTERNAL DEVICE BY ELECTRONIC DEVICE, AND ELECTRONIC DEVICE THEREFOR

TECHNICAL FIELD

The present disclosure relates to a method, performed by an electronic device, of controlling an external device, and the electronic device therefor.

BACKGROUND ART

As mobile devices have become common, the mobile devices function as a hub for controlling surrounding devices as well as themselves. In wearable and Internet of Things (IOT) environments, the importance of mobile devices is increasing more and more.

The mobile devices provide dedicated applications for controlling external devices, such as a remote controller application for controlling a smart TV. However, the dedicated applications provided by the mobile devices do not usually deviate from the functions of typical remote controllers. Also, a user of a mobile device needs to learn about the dedicated applications provided by the mobile device in order to use them, which causes the user inconvenience.

DESCRIPTION OF EMBODIMENTS

Technical Problem

According to a first aspect of an embodiment for overcoming the above-described problem, there is provided an operation method of an electronic device for controlling an external device, the operation method including: receiving a user input to a user interface (UI) provided for controlling the electronic device; when the foreground application is associated with the external device, determining whether a foreground application is associated with the external device; and transmitting a control signal corresponding to the user input to the external device.

Also, the user interface may be at least one graphical user interface (GUI) provided for controlling the electronic device or at least one button included in the electronic device.

Also, the determining of whether the foreground application is associated with the external device may include: receiving, from the external device, identification information of an application installed in the external device and execution information of a control application for controlling the application installed in the external device; and when the foreground application matches with the execution information of the control application, determining that the foreground application is associated with the external device.

Also, the foreground application may be provided based on an application installation file received from the external device.

Also, the foreground application may be provided based on Uniform Resource Locator (URL) information received from the external device.

Also, when the user interface is a volume adjustment button, the control signal may be a volume-up signal for increasing the volume of the external device or a volume-down signal for decreasing the volume of the external device.

Also, when the user interface is a home button, the control signal may be a signal for converting a screen of the external device to a home screen.

Also, when the user interface is a GUI for activating a setting window, the control signal may be a signal for converting a screen of the external device to a setting window screen.

Also, the foreground application may be executed according to a user input of selecting an application from an application list displayed on the electronic device, and the application list may include identification information of applications installed in the external device.

Also, the application list may be displayed distinctively from an application list including identification information of applications installed in the electronic device.

Also, the foreground application may be a widget including at least one of state information of the external device and information about an application being executed on the external device.

Also, the user interface may be provided to control at least one application being executed on the electronic device, and the operation method of the electronic device may further include: receiving identification information of at least one application being executed on the external device; and displaying a task management window including the identification information of the at least one application being executed on the external device and identification information of the at least one application being executed on the electronic device.

Also, the method according to the first aspect may further include: receiving a user input for terminating at least one application being executed on the external device, on the task management window; and transmitting an application termination signal to the external device in response to the user input.

According to a second aspect, there is provided an electronic device for controlling an external device, the electronic device including: a user interface configured to receive a user input made on a user interface (UI) provided for controlling the electronic device; a controller configured to determine whether a foreground application is associated with the external device, and to generate a control signal corresponding to the user input, when the foreground application is associated with the external device; and a communicator configured to transmit the control signal to the external device.

According to a third aspect, there is provided a computer-readable recording medium having recorded thereon a program for implementing the method of the first aspect.

Advantageous Effects of Disclosure

The embodiments aim to provide a method of controlling external devices based on user experience provided by an electronic device, and the electronic device.

BRIEF DESCRIPTION OF DRAWINGS

FIG. 4 is a flowchart for describing a method by which an electronic device determines whether a foreground application is associated with an external device, according to an embodiment.

FIG. 9 shows another example in which an electronic device executes a control application associated with an external device.

FIG. 20 shows an example in which an electronic device provides an external device with a control signal corresponding to a UI provided for activating a setting window of the electronic device.

BEST MODE

Figure 1:
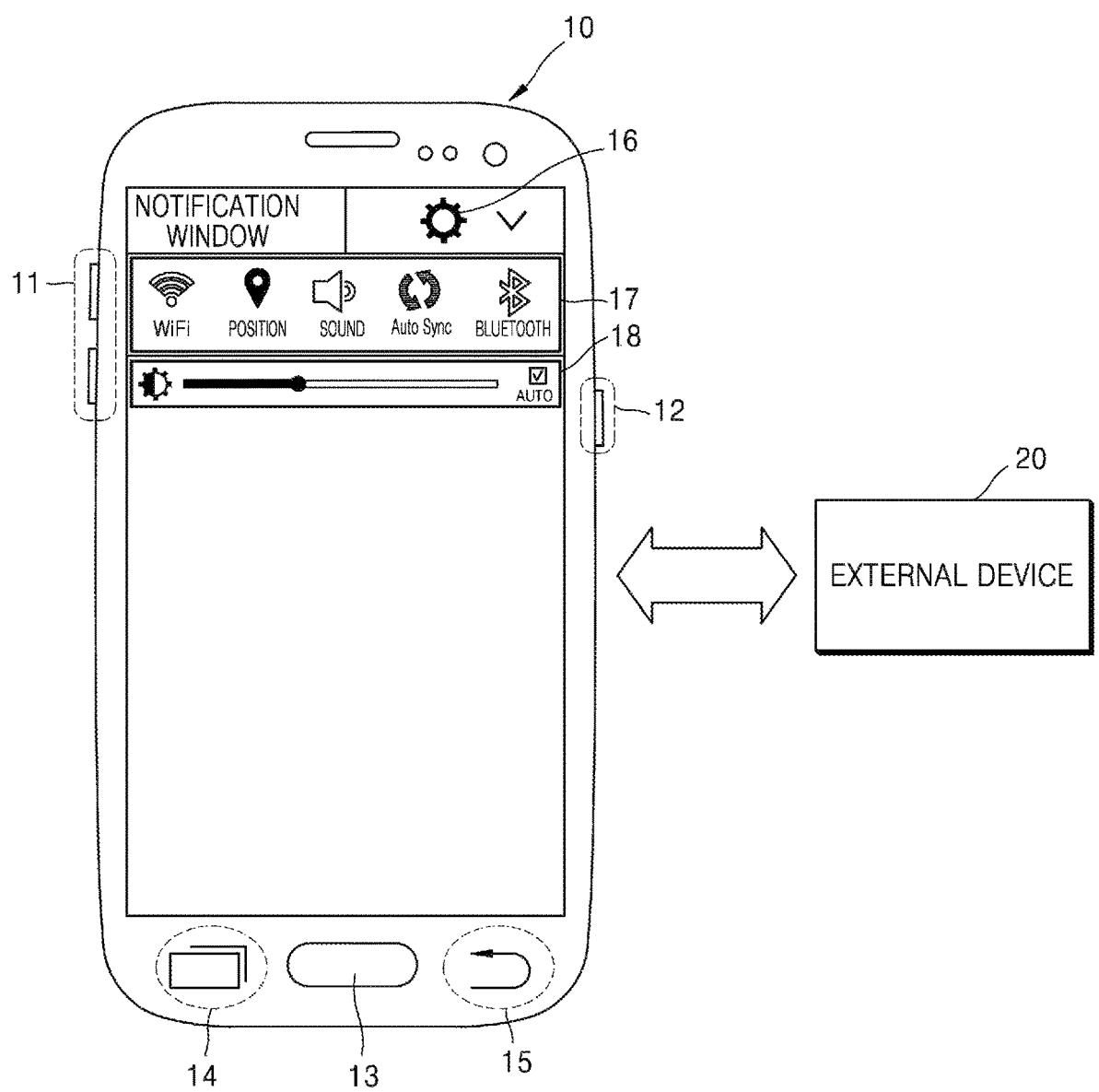
FIG. 1 is a schematic view for describing a method by which an electronic device controls an external device.

According to a first aspect of an embodiment for solving the above-described problems, there is provided a method by which an electronic device controls an external device, the method including: receiving a user input to a user interface (UI) provided for controlling the electronic device; determining whether a foreground application is associated with an external device; and, when the foreground application is associated with the external device, transmitting a control signal corresponding to the user input to the external device.

According to a second aspect, there is provided an electronic device including: a user interface configured to receive a user input to a UI provided for controlling the electronic device; a controller configured to determine whether a foreground application is associated with an external device, and, when the foreground application is associated with the external device, to generate a control signal corresponding to the user input; and a communicator configured to transmit the control signal to the external device.

MODE OF DISCLOSURE

Hereinafter, terms used in the present specification will be briefly described, and then the present disclosure will be described in detail.

Although general terms being widely used at the present disclosure were selected as terminology used in the present disclosure while considering the functions of the present disclosure, they may vary according to intentions of one of ordinary skill in the art, judicial precedents, the advent of new technologies, and the like. Terms arbitrarily selected by the applicant of the present disclosure may also be used in a specific case. In this case, their meanings need to be given in the detailed description of the present disclosure. Hence, the terms must be defined based on the meanings of the terms and the contents of the entire specification, not by simply stating the terms themselves.

It will be understood that, although the terms first, second, etc. may be used herein to describe various components, these components should not be limited by these terms. These terms are only used to distinguish one component from another. For example, a first component could be termed a second component, and, similarly, a second component could be termed a first component, without departing from the scope of the present disclosure. As used herein, the term "and/or" includes any and all combinations of one or more of associated listed items.

It will be understood that when the terms "includes," "comprises," "including," and/or "comprising," when used in this specification, specify the presence of stated elements and/or components, but do not preclude the presence or addition of one or more elements and/or components thereof. As used herein, the terms "part", "module", or "unit" refers to a unit that can perform at least one function or operation, and may be implemented as a software or hardware component such as a Field Programmable Gate Array (FPGA) or an Application Specific Integrated Circuit (ASIC), or as a combination of software and hardware. However, the term "part", "module" or "unit" is not limited to software or hardware. The "part", "module", or "unit" may be configured in an addressable storage medium, or may be configured to run on at least one processor. Therefore, as an example, the "part", "module", or "unit" includes: components such as software components, object-oriented software components, class components, and task components; processors, functions, attributes, procedures, sub-routines, segments of program codes, drivers, firmware, microcodes, circuits, data, databases, data structures, tables, arrays, and variables. Functions provided in the components and the "part", "module", or "unit may be combined into a smaller number of components and "part", "module", or "unit", or further distributed to additional components and "part", "module", or "unit.

Hereinafter, embodiments of the present disclosure will be described in detail with reference to the accompanying drawings such that one of ordinary skill in the art can easily embody the present disclosure. However, the present disclosure is not limited to these embodiments, and may be embodied in another form. In the drawings, parts that are irrelevant to the descriptions may be not shown in order to clarify the present disclosure, and also, through the entire specification, like reference numerals refer to like components.

FIG. 1 is a schematic view for describing a method by which an electronic device controls an external device.

Referring to FIG. 1, an electronic device 10 may be connected to at least one external device 20 through a network allowing communications with the external device 20.

According to an embodiment, the electronic device 10 may control the at least one external device 20 using a user interface (UI) provided for controlling the electronic device 10. The UI provided for controlling the electronic device 10 may have been set in advance to allow a user to intuitively control basic functions of the electronic device 10. For example, the electronic device 10 may provide a UI for allowing a user to intuitively control various functions of the electronic device 10, such as volume adjustment, screen brightness adjustment, screen conversion, task management, a communication connection, etc. Also, the UI provided for controlling the electronic device 10 may include a plurality of physical buttons 11 to 13, a plurality of soft buttons 14 to 15, or a plurality of graphical user interfaces (GUIs) 16 to 18, etc., included in the electronic device 10.

According to an embodiment, the electronic device 10 may intuitively control functions of the external device 20 using the UI provided for controlling the electronic device 10, when a foreground application is associated with the external device 20. Herein, the foreground application may be an application currently activated in a multi-tasking environment. Also, the application associated with the external device 20 may be an application provided from the external device 20 or an application provided based on information provided from the external device 20.

Generally, a UI provided for controlling the electronic device 10 may control the functions of the electronic device 10 regardless of a foreground application. However, according to an embodiment, the electronic device 10 may control the functions of the electronic device 10 or the external device 20 based on whether a foreground application is associated with the electronic device 10 or the external device 20. For example, when a foreground application is associated with the external device 20, the electronic device 10 may provide the external device 20 with a control signal corresponding to a user input made on the UI provided in the electronic device 10, thereby controlling the functions of the external device 20, such as volume adjustment, screen brightness adjustment, screen conversion, task management, a communication connection, etc.

The electronic device 10 may include at least one of a smart phone, a tablet personal computer (PC), a mobile phone, a video phone, an e-book reader, a desktop PC, a laptop PC, a netbook computer, a personal digital assistant (PDA), a portable multimedia player (PMP), a MP3 player, or mobile medical equipment.

Also, the external device 20 may be a home appliance. The home appliance may include at least one of, for example, a television, a digital video disk (DVD) player, audio system, a refrigerator, an air conditioner, a cleaner, an oven, a microwave, a washing machine, an air cleaner, a set-top box, a home automation control panel, a security control panel, a TV box (for example, Samsung HomeSync™, AppleTV™, or GoogleTV™), a game console (for example, Xbox™ and PlayStation™), an electronic dictionary, an electronic key, a camcorder, or an electronic album.

Alternatively, the external device 20 may be a wearable device. The wearable device may include at least one of, for example, an accessary type (for example, a watch, a ring, a bracelet, an ankle bracelet, a necklace, glasses, contact lenses, or a head-mounted-device (HMD)), a fabric- or clothes-combined type (for example, electronic clothes), a body attached type (for example, a skin pad or a tattoo), or a bio-implantable type (for example, an implantable circuit).

Alternatively, the electronic device 10 may include at least one of various medical equipment (for example, various portable medical measuring equipment including a blood glucose monitor, a heart rate monitor, a thermometer, etc.), magnetic resonance angiography (MRA), magnetic resonance imaging (MRI), computed tomography (CT), a scanner, or ultrasonic machinery), navigation system, global navigation satellite system (GNSS), an event data recorder (EDR), a flight data recorder (FDR), a vehicle infotainment apparatus, electronic equipment for ships (for example, navigation system for ships, gyrocompass, etc.), avionics, security system, a vehicle head unit, an industrial or home robot, an automatic teller's machine (ATM) for banks, point of sales (POS) of stores, or internet of things (IOT) (for example, bulbs, various sensors, an electricity or gas meter, a sprinkler, a fire alarm, a thermostat, a streetlamp, a toaster, exercise equipment, etc.).

Figure 2:
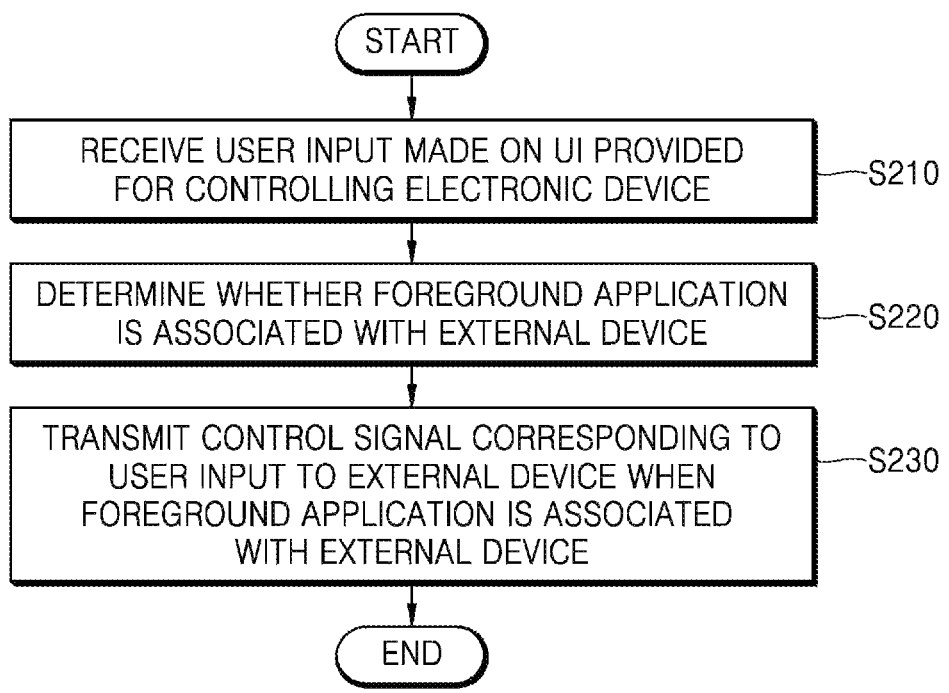
FIG. 2 is a flowchart for describing an operation method of an electronic device, according to an embodiment.

FIG. 2 is a flowchart for describing an operation method of an electronic device according to an embodiment.

Referring to FIG. 2, in operation S210, the electronic device 10 may receive a user input made on an UI provided for controlling the electronic device 10. The UI provided for controlling the electronic device 10 may be at least one button included in the electronic device 10 or at least one GUI provided to control the electronic device 10. Also, the user input may be a pressed input, a continuously-pressed input, a long-pressed input, a touch input, a long-pressed touch input, etc., made on the button or the GUI provided in the electronic device 10.

Figure 3A:
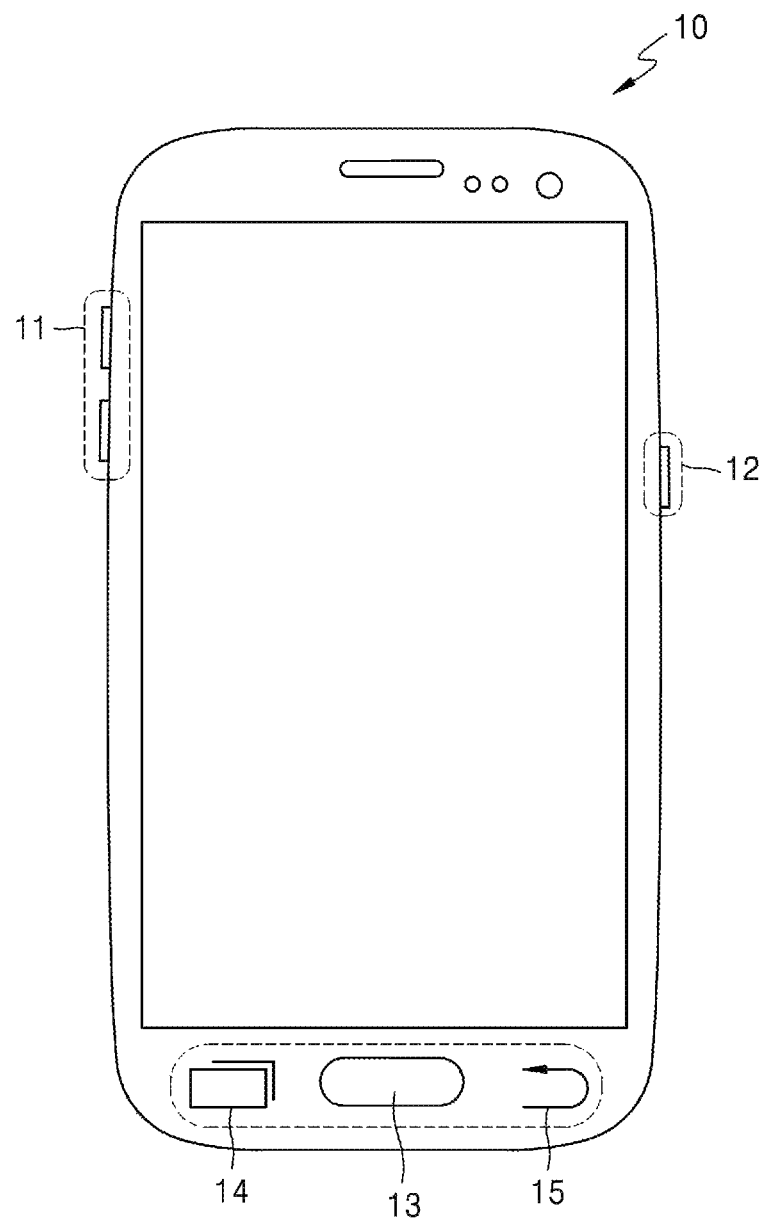
FIGS. 3A and 3B show an example of a user interface (UI) provided for controlling an electronic device.
Figure 3B:
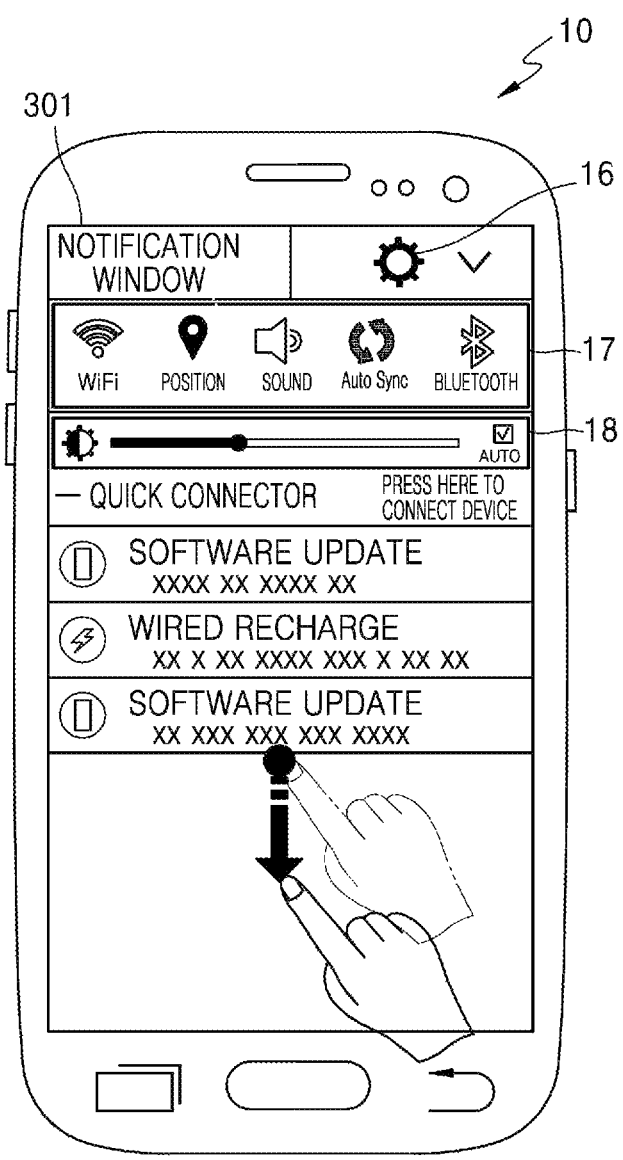

FIGS. 3A and 3B show an example of a UI provided for controlling an electronic device.

Referring to FIG. 3A, the electronic device 10 may provide a physical button and a soft button for controlling the electronic device 10. For example, the electronic device 10 may provide physical buttons including volume adjustment buttons 11 for controlling the volume, a power button 12, and a home button 13. Also, the electronic device 10 may provide soft buttons including a task management button 14 and an execution cancel button 15. However, the electronic device 10 may provide a larger or smaller number of buttons according to a manufacturing company. For example, the electronic device 10 may perform an operation corresponding to the task management button 14 based on a user input (for example, a continuously-pressed input or a long-pressed input) made on the home button 13.

Referring to FIG. 3B, the electronic device 10 may provide a GUI for controlling the electronic device 10. For example, the electronic device 10 may activate a notification window 301 in response to a touch & drag input made on an upper end of the screen. Also, the electronic device 10 may provide a setting window activation GUI 16, a screen brightness adjustment GUI 18, and quick setting GUIs 17 for quickly changing various settings of the electronic device 10 through the notification window 301. However, the electronic device 10 may provide various GUIs for controlling the electronic device 10 according to a manufacturing company or a user.

Referring again to FIG. 2, according to an embodiment, the electronic device 10 may receive a user input made on at least one UI shown in FIG. 3A or 3B.

In operation S220, the electronic device 10 may determine whether a foreground application is associated with an external device 20.

According to an embodiment, the electronic device 10 may determine whether a foreground application is associated with the external device 20, based on identification information of an application being executed on the external device 20 and received from the external device 20. For example, when the electronic device 10 determines that the identification information received from the external device 20 matches with identification information of the foreground application, the electronic device 10 may determine that the foreground application is associated with the external device 20.

Or, the electronic device 10 may receive information about applications installed in the external device 20 in advance, and determine whether the foreground application matches with the received information about the applications. Herein, the information about the applications installed in the external device 20 may include identification information of the applications installed in the external device 20, and execution information of a control application for controlling the applications installed in the external device 20. The control application may enable the electronic device 10 to control an application that is executed on the external device 20. Meanwhile, the electronic device 10 may receive the information about the applications installed in the external device 20 at regular time intervals or at a predetermined time.

Also, the electronic device 10 may provide an application list including the identification information of the applications installed in the external device 20. When the electronic device 10 receives a user input of selecting an application from the application list, the electronic device 10 may transmit a control signal for executing the selected application to the external device 20, and execute a control application corresponding to the selected application. When the control application is being executed as a foreground application, the control application may be associated with the external device 20, and match with the received information about the applications.

In operation S230, when the electronic device 10 determines that the foreground application is associated with the electronic device 10, the electronic device 10 may transmit a control signal corresponding to a user input to the external device 20.

According to an embodiment, the electronic device 10 may transmit a control signal corresponding to a user input to the external device 20, instead of performing an operation corresponding to the user input. For example, the electronic device 10 may transmit a control signal corresponding to a user input for performing an operation, such as volume adjustment, screen brightness adjustment, a communication connection, etc., to the external device 20.

Or, the electronic device 10 may transmit a control signal corresponding to a user input to the external device 20, while performing an operation corresponding to the user input. For example, the electronic device 10 may transmit a control signal corresponding to a user input for performing an operation, such as setting window activation, screen conversion, etc., to the external device 20, while performing the operation, such as activating a setting window of the electronic device 10, converting the screen, etc.

Meanwhile, when the electronic device 10 is connected to a plurality of external devices 20 through communications, the electronic device 10 may transmit a control signal to a specific external device 20 associated with the foreground application.

The external device 20 may perform an operation corresponding to the received control signal.

FIG. 4 is a flowchart for describing a method by which an electronic device determines whether a foreground application is associated with an external device, according to an embodiment.

Referring to FIG. 4, in operation S410, the external device 20 may transmit identification information of an application installed in the external device 20, and execution information of a control application for controlling the application installed in the external device 20, to the electronic device 10.

For example, the external device 20 may transmit application identification information including an identification value 401 and an icon image 402 of an application installed in the external device 20, and execution information 403 of a control application for controlling the application installed in the external device 20, to the electronic device 10. Herein, the execution information 403 of the control application may include at least one of information about an identification value and an execution file of a control application that is executed on the electronic device 10 in order for the electronic device 10 to control the application installed in the external device 20. For example, the execution information 403 of the control application may include Uniform Resource Locator (URL) information, information of an application installation file, widget execution information, etc. Also, the identification value 401 of the application may include a name, a code, an ID, channel information, etc. of the application installed in the external device 20. Meanwhile, the electronic device 10 may manage information about applications received from the external device 20 in the form of a table 400.

According to an embodiment, the electronic device 10 may provide an application list including at least one of the identification value 401 and the icon image 402 of the application, based on the application identification information received from the external device 20. Also, when an application is selected from the application list, the electronic device 10 may provide a control signal for executing the selected application to the external device 20, and execute a control application corresponding to the selected application. The control application may be installed, for example, in the electronic device 10 and executed on the electronic device 10. The control application may be a web application or a widget provided through a browser. As such, the electronic device 10 may execute and control applications installed in the external device 20, without installing a dedicated application for controlling the external device 20.

In operation S420, the electronic device 10 may determine whether a foreground application is associated with the external device 20, based on the received identification information of the application.

According to an embodiment, the electronic device 10 may determine whether a value matching with the foreground application exists in values stored in the table 400. For example, the electronic device 10 may determine whether execution information of the foreground application matches with the execution information 403 of the control application stored in the table 400.

Or, according to an embodiment, the electronic device 10 may add a flag to an application descriptor to represent a device with which each application is associated. In this case, the electronic device 10 may determine whether the foreground application is associated with the external device 20 by referring to the added flag.

Figure 5:
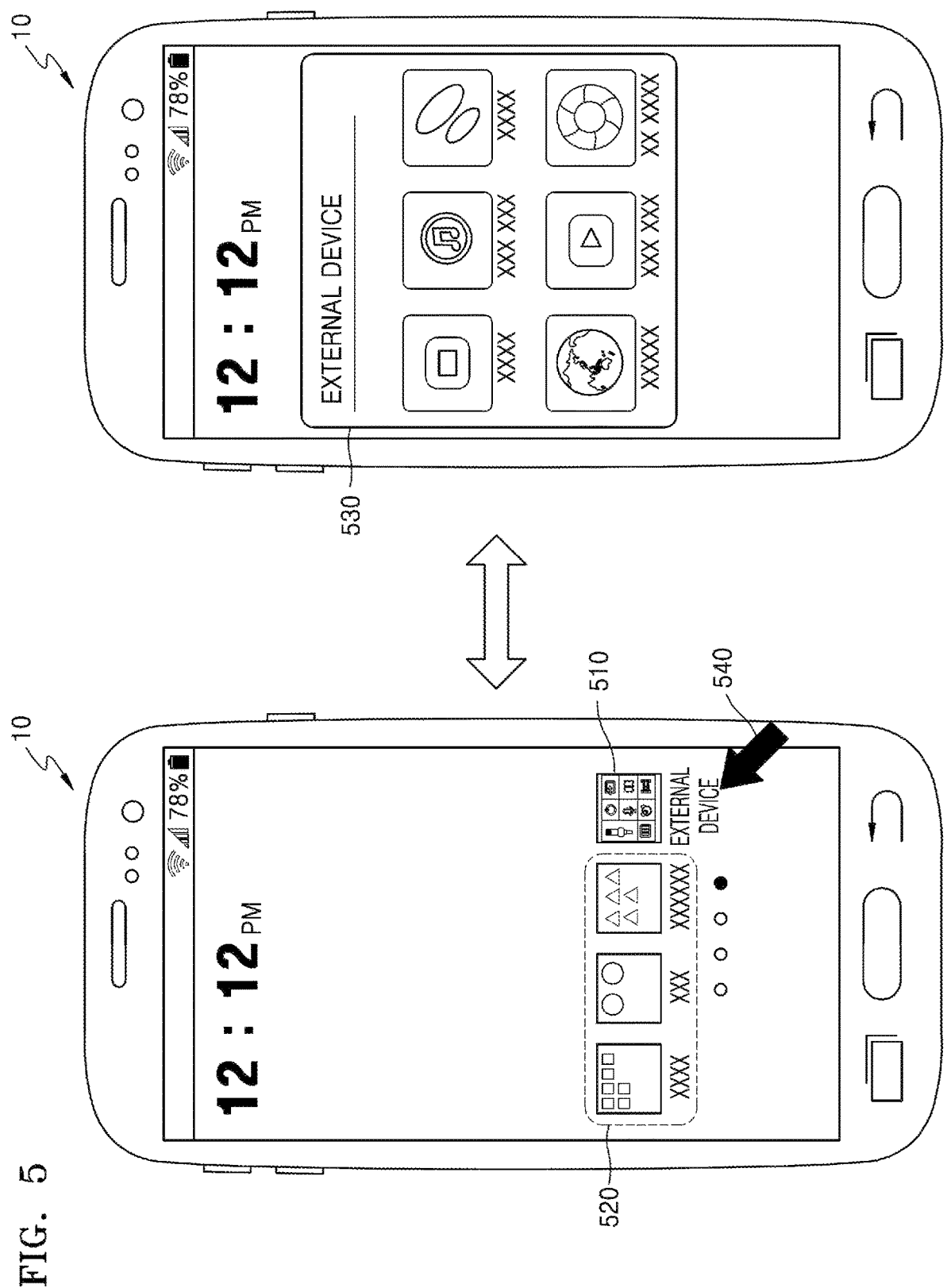
FIG. 5 shows an example in which an electronic device provides an application list including identification information of applications installed in an external device.

FIG. 5 shows an example in which an electronic device provides an application list including identification information of applications installed in an external device.

Referring to FIG. 5, according to an embodiment, the electronic device 10 may receive identification information of applications installed in the external device 20, and provide an application list including the identification information of the applications installed in the external device 20. For example, the electronic device 10 may provide an application list using identification values (401 of FIG. 4) and icon images (402 of FIG. 4) of the applications installed in the external device 20.

Also, the electronic device 10 may provide a folder 510 including an application list. When the electronic device 10 receives a user input 540 made on the folder 510, the electronic device 10 may display an application list 530 included in the folder 510 on the screen.

Meanwhile, the electronic device 10 may display an application list including identification information of applications installed in the electronic device 10, and an application list including identification information of applications installed in the external device 20, distinctively. For example, the electronic device 10 may provide at least one folder 520 including identification information of applications installed in the electronic device 10, and at least one folder 510 including identification information of applications installed in the external device 20, distinctively.

Figure 6:
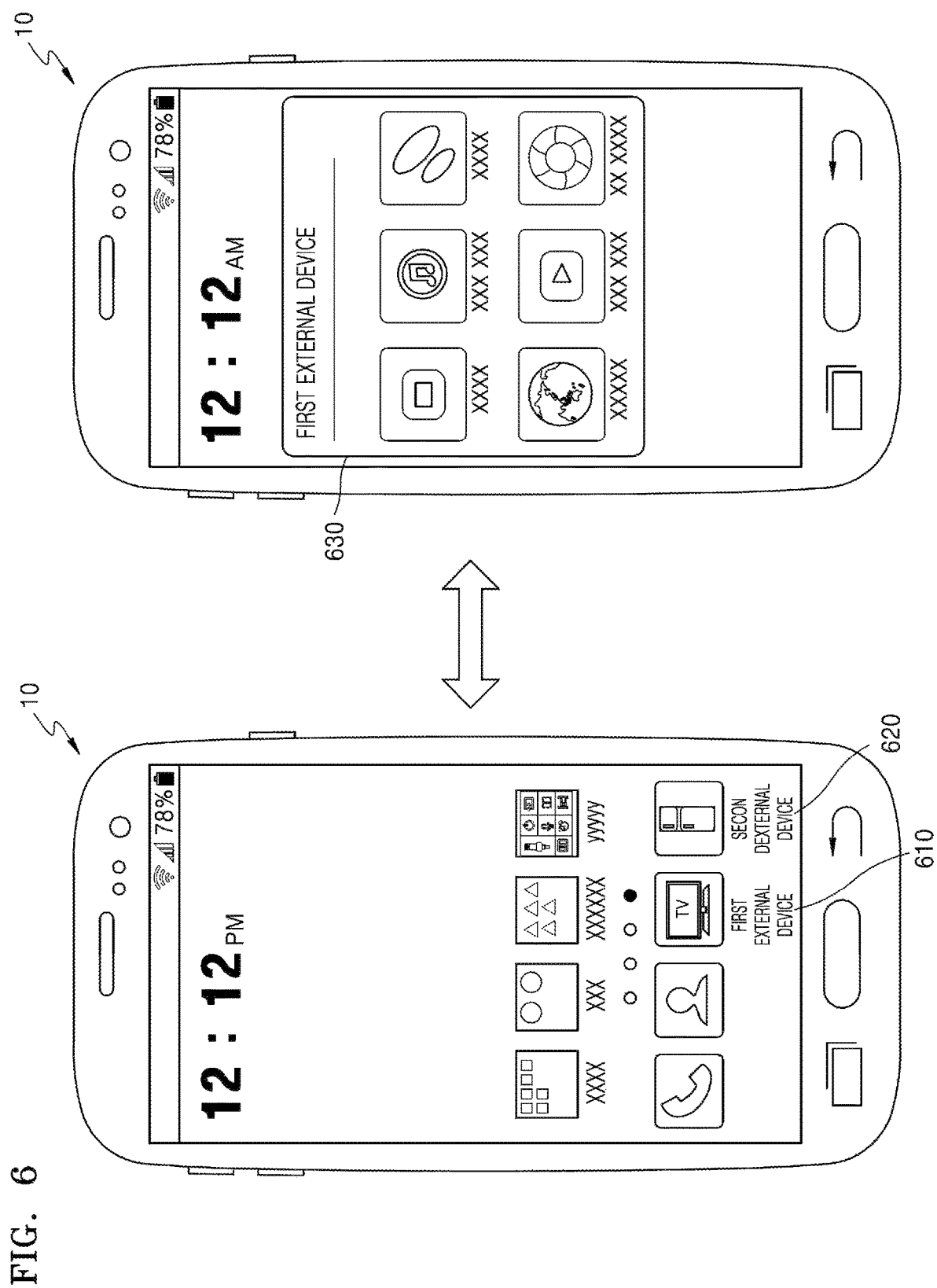
FIG. 6 shows another example in which an electronic device provides an application list including identification information of applications installed in an external device.

FIG. 6 shows another example in which an electronic device provides an application list including identification information of applications installed in an external device.

Referring to FIG. 6, according to an embodiment, the electronic device 10 may provide icon images 610 and 620 intuitively representing external devices 20 to thus provide an application list corresponding to each external device 20.

For example, the electronic device 10 may display an icon image 610 representing a first external device and an icon image 620 representing a second external device on a home screen. When the electronic device 10 receives a user input made on the icon image 610 of the first external device, the electronic device 10 may display an application list 630 including identification information of applications installed in the first external device.

Figure 7:
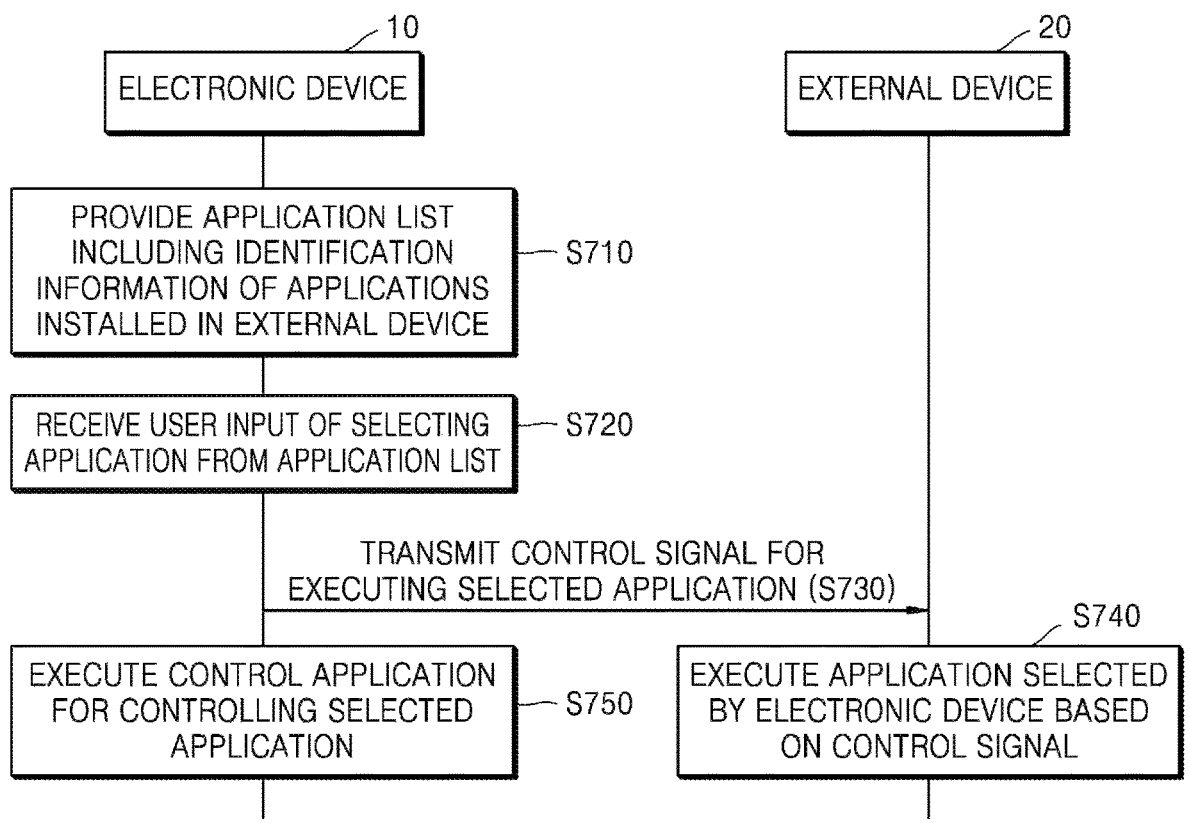
FIG. 7 is a flowchart for describing a method by which an application associated with an external device is executed based on an application list provided by an electronic device.

FIG. 7 is a flowchart for describing a method by which an application associated with an external device is executed, based on an application list provided by an electronic device.

Referring to FIG. 7, in operation S710, the electronic device 10 may provide an application list including identification information of applications installed in the external device 20.

In operation S720, the electronic device 10 may receive a user input of selecting an application from the application list.

In operation S730, the electronic device 10 may transmit a control signal for executing the selected application to the external device 20. In operation S740, the external device 20 may execute the application selected by the electronic device 10 based on the received control signal.

In operation S750, the electronic device 10 may execute a control application for controlling the selected application. The control application may be an application that is executed based on an installation file received from the external device 20, a web application that is executed based on URL, or a widget. Also, the control application that is executed on the electronic device 10 may be associated with the external device 20.

Figure 8:
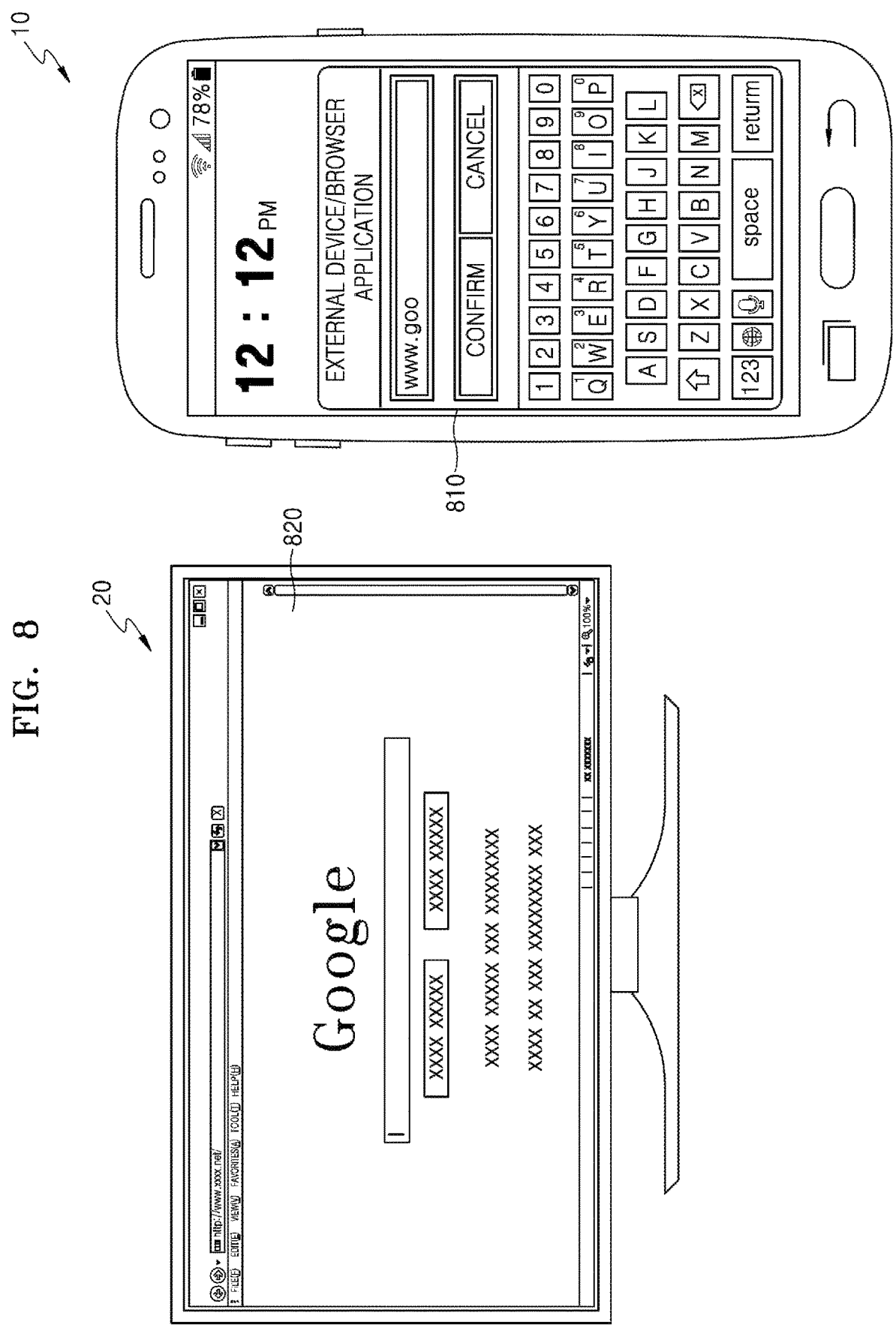
FIG. 8 shows an example in which an electronic device executes a control application associated with an external device.

FIG. 8 shows an example in which an electronic device executes a control application associated with an external device.

Referring to FIG. 8, the electronic device 10 may execute a browser control application 810 for controlling a browser application 820 that is executed on the external device 20. At this time, the browser control application 810 may be installed in the electronic device 10 based on an installation file received from the external device 20. Also, the browser control application 810 may provide a GUI for controlling an input of the browser application 820, a web-page movement, a content selection, etc.

FIG. 9 shows another example in which an electronic device executes a control application associated with an external device.

Referring to FIG. 9, the electronic device 10 may execute a web application 910 for controlling an Audio/Video (A/V) content reproducing application 920 that is executed on the external device 20. For example, the web application 910 may access URL received from the external device 20 to provide a GUI for controlling a content selection, content reproduction, etc. of the A/V content reproducing application 920.

Figure 10:
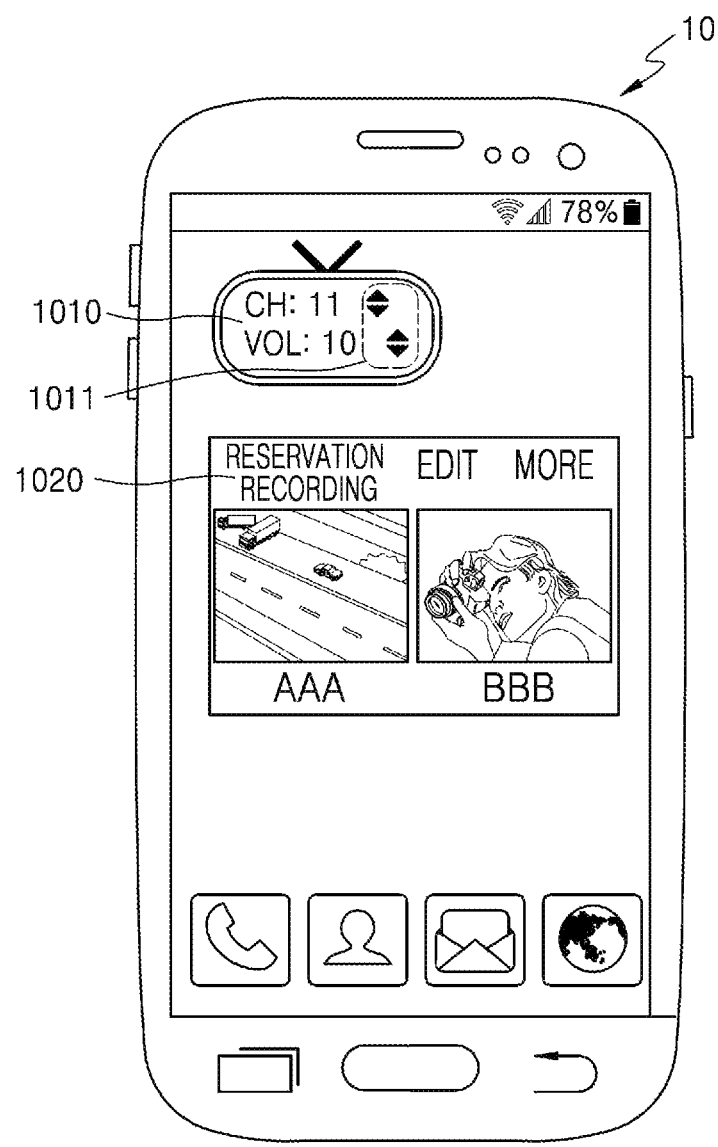
FIG. 10 shows another example in which an electronic device executes a control application associated with an external device.

FIG. 10 shows still another example in which an electronic device executes a control application associated with an external device.

Referring to FIG. 10, the electronic device 10 may execute widgets 1010 and 1020 for providing at least one of state information of the external device 20 and information of an application being executed on the external device 20. For example, when the electronic device 10 receives a long-pressed touch input made on an icon (610 of FIG. 6) representing the external device 20, the electronic device 10 may provide a widget 1010 representing state information of the external device 20. Also, the electronic device 10 may execute a widget 1020 corresponding to an application selected from an application list.

Also, when the electronic device 10 receives an event from the external device 20, the electronic device 10 may provide a widget (not shown) including the event. Herein, the event may include a notification event (for example, a TV program start time notifying event, a refrigerator open notifying event, etc.) set in advance in the external device 20, an update event of an application installed in the external device 20, etc. Meanwhile, the event received from the external device 20 may be displayed on a notification bar or a notification window (301 of FIG. 3B) of the electronic device 10.

Meanwhile, control applications shown in FIGS. 8 to 10 may provide various GUIs, and the electronic device 10 may control the external device 20 using a user input made on the GUIs. Also, according to an embodiment, when the control applications shown in FIGS. 8 to 10 operate as foreground applications, the electronic device 10 may control the external device 20 using a user input made on the UI provided for controlling the electronic device 10.

Figure 11:
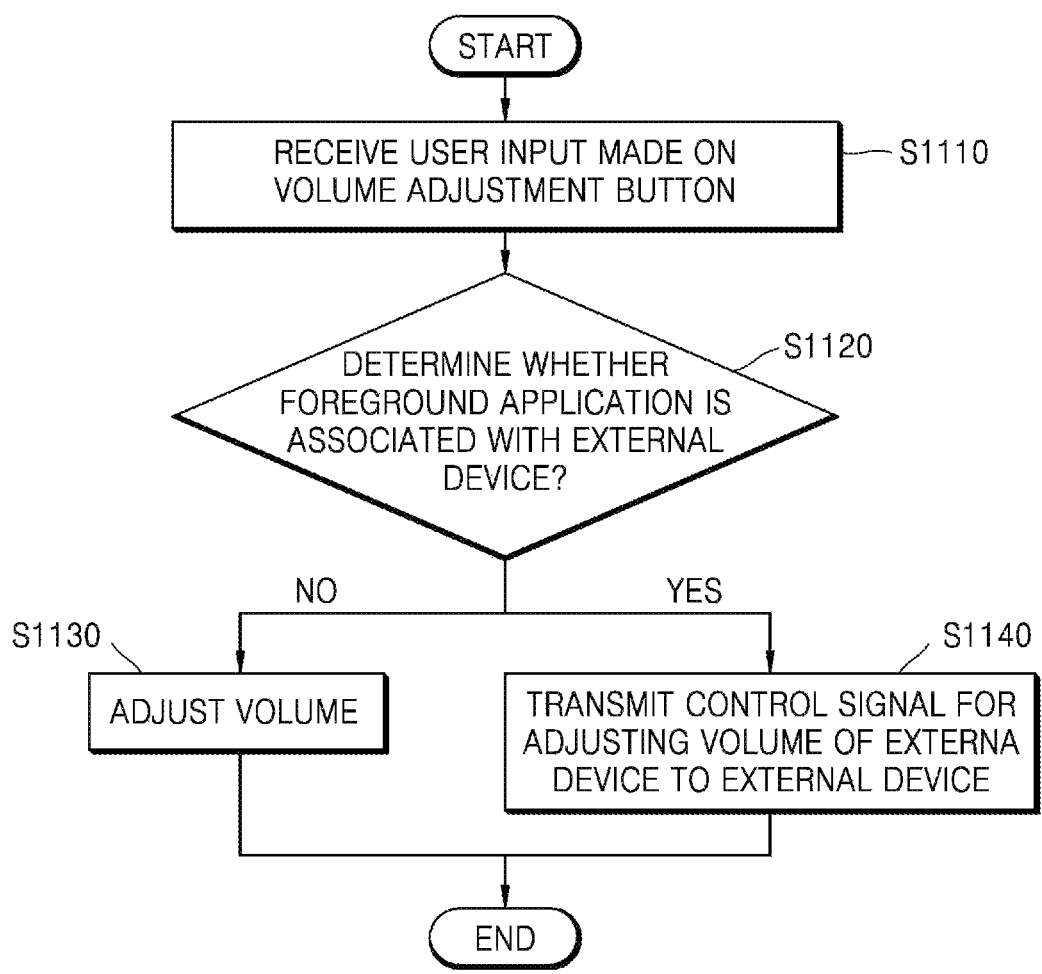
FIG. 11 is a flowchart for describing a method by which an electronic device provides an external device with a control signal corresponding to a UI provided for controlling the volume of the electronic device.

FIG. 11 is a flowchart for describing a method by which an electronic device provides an external device with a control signal corresponding to a UI provided for controlling the volume of the electronic device.

Referring to FIG. 11, in operation S1110, the electronic device 10 may receive a user input made on the volume adjustment buttons 11 included in the electronic device 10.

In operation S1120, the electronic device 10 may determine whether a foreground application is associated with the external device 20. When the electronic device 10 determines that the foreground application is not associated with the external device 20, the electronic device 10 may adjust the volume of the electronic device 10 in response to the user input, in operation S1130.

When the electronic device 10 determines that the foreground application is associated with the external device 20, the electronic device 10 may transmit a control signal for adjusting the volume of the external device 20 to the external device 20, in operation S1140. For example, when the electronic device 10 receives a pressed input made on an up button among the volume adjustment buttons 11, the electronic device 10 may transmit a control signal for increasing the volume of the external device 20 to the external device 20. Also, when the electronic device 10 receives a pressed input made on a down button among the volume adjustment buttons 11, the electronic device 10 may transmit a control signal for decreasing the volume of the external device 20 to the external device 20.

Figure 12:
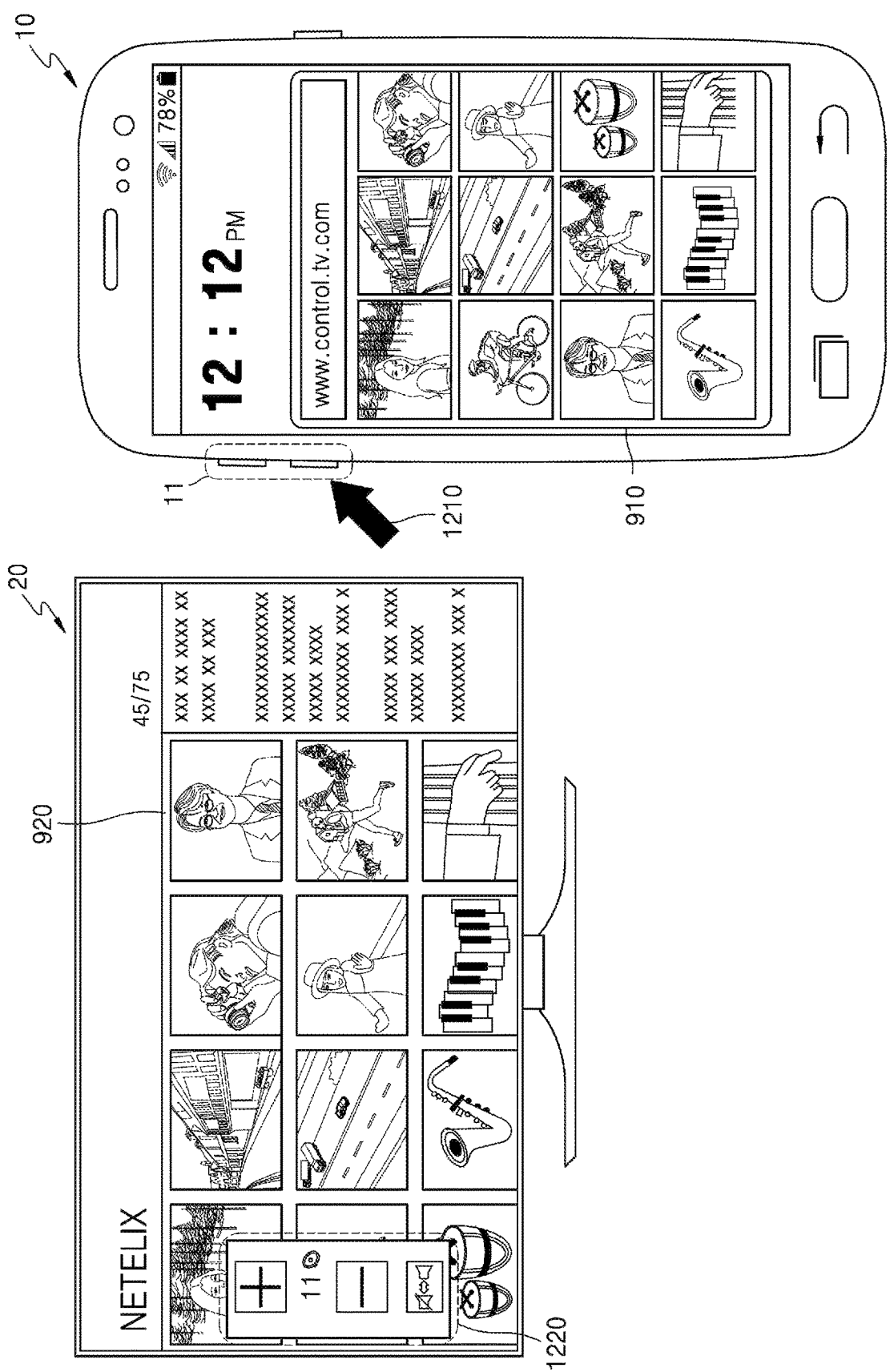
FIG. 12 shows an example in which an electronic device provides an external device with a control signal corresponding to a UI provided for controlling the volume of the electronic device.

FIG. 12 shows an example in which an electronic device provides an external device with a control signal corresponding to a UI provided for controlling the volume of the electronic device.

Referring to FIG. 12, when the electronic device 10 executes a web application 910 associated with the external device 20, the electronic device 10 may receive a user input 1210 made on the volume adjustment buttons 11 for adjusting the volume of the electronic device 10. Also, the electronic device 10 may provide a control signal corresponding to the user input 1210 to the external device 20.

The external device 20 may adjust the volume based on the control signal received from the electronic device 10. Also, the external device 20 may display an image 1220 representing the volume that is adjusted by the electronic device 10 on the screen.

Figure 13:
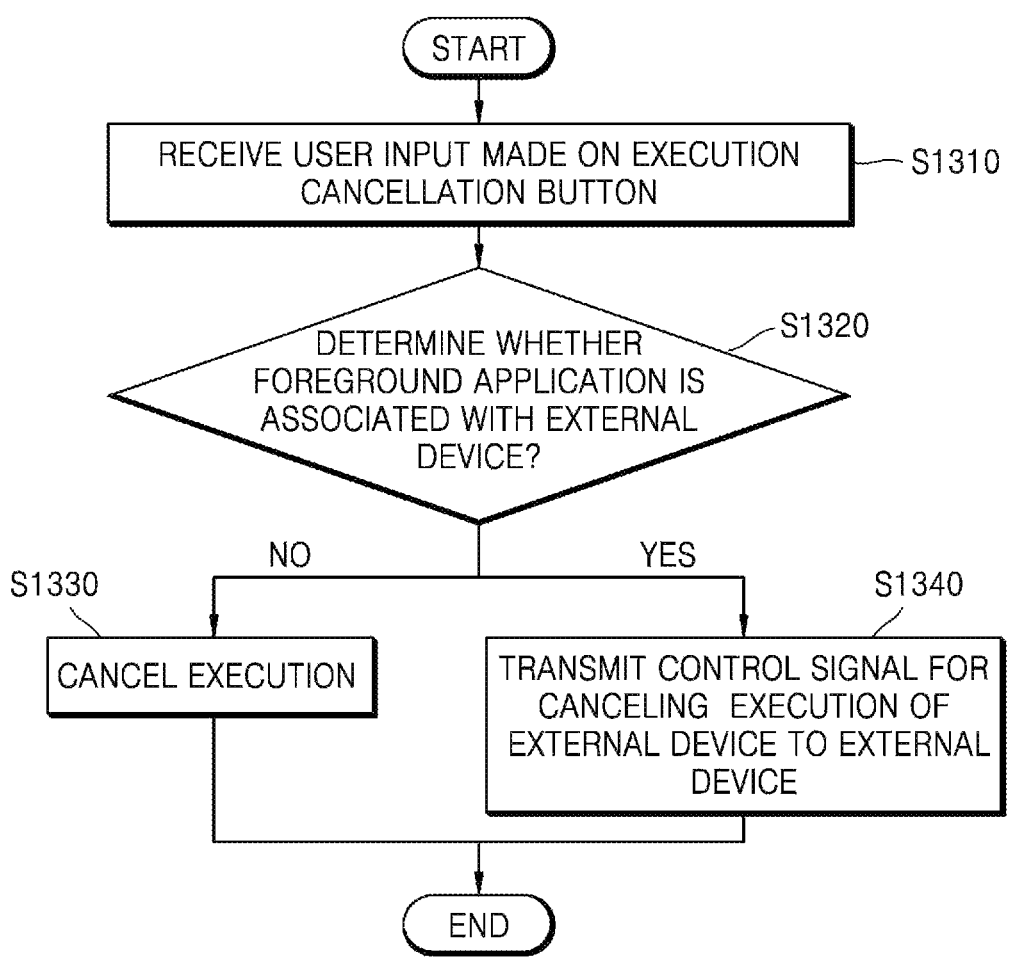
FIG. 13 is a flowchart for describing a method by which an electronic device provides an external device with a control signal corresponding to a UI provided for cancelling an execution of the electronic device.

FIG. 13 is a flowchart for describing a method by which an electronic device provides an external device with a control signal corresponding to a UI provided for cancelling an execution of the electronic device.

Referring to FIG. 13, in operation S1310, the electronic device 10 may receive a user input made on an execution cancellation button 15 included in the electronic device 10.

In operation S1320, the electronic device 10 may determine whether a foreground application is associated with the external device 20. When the electronic device 10 determines that the foreground application is not associated with the external device 20, the electronic device 10 may cancel a task executed finally on the electronic device 10 in response to the user input, in operation S1330.

When the electronic device 10 determines that the foreground application is associated with the external device 20, the electronic device 10 may transmit a control signal for canceling the task executed finally on the external device 20 to the external device 20, in operation S1340.

Figure 14:
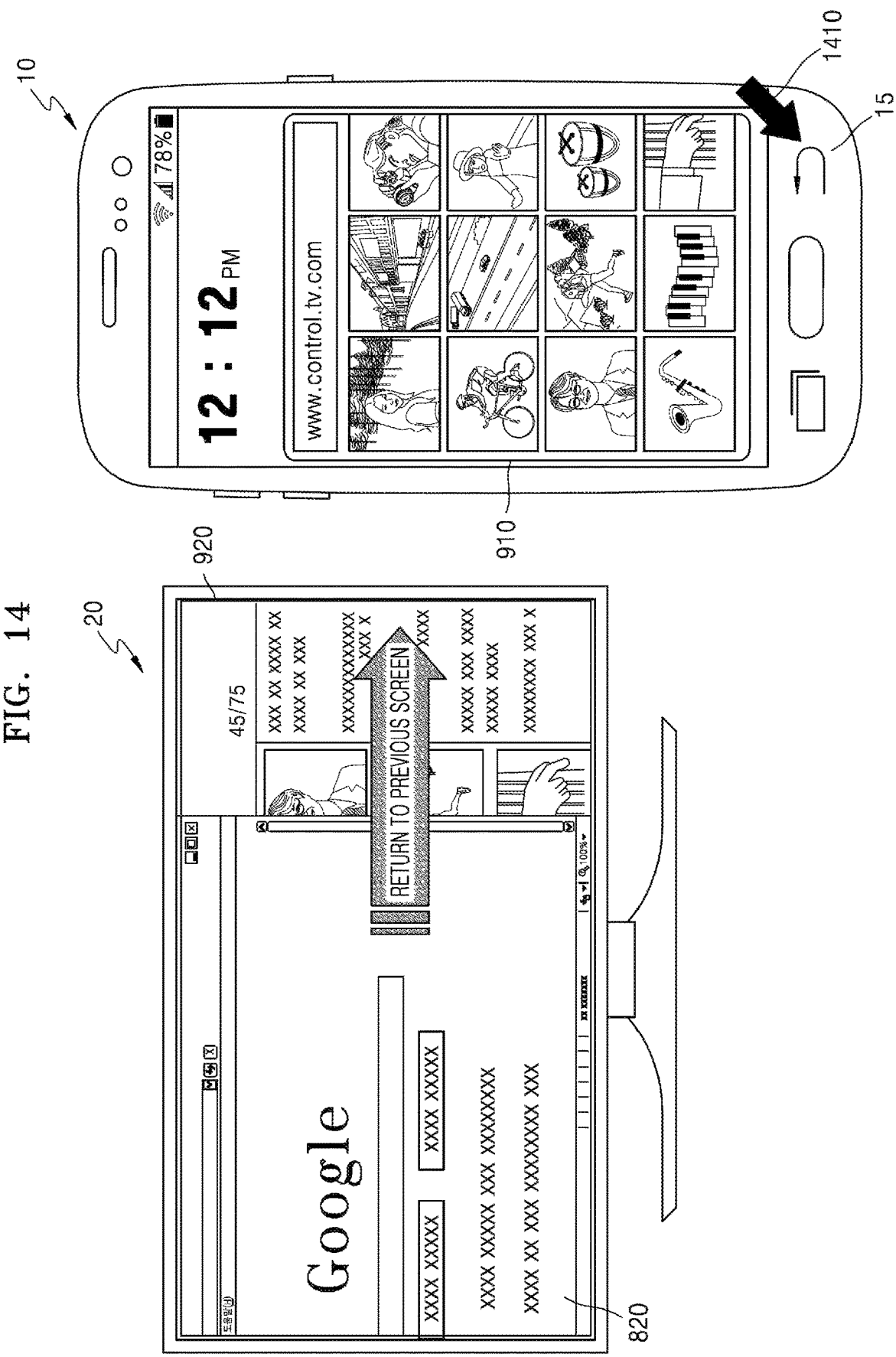
FIG. 14 shows an example in which an electronic device provides an external device with a control signal corresponding to a UI provided for cancelling an execution of the electronic device.

FIG. 14 shows an example in which an electronic device provides an external device with a control signal corresponding to a UI provided for cancelling an execution of the electronic device.

Referring to FIG. 14, when the electronic device 10 executes a web application 910 associated with the external device 20, the electronic device 10 may receive a user input 1410 made on the execution cancellation button 15. The electronic device 10 may transmit a control signal corresponding to the user input 1410 to the external device 20.

The external device 20 may cancel a task executed finally on the external device 20 based on the received control signal, and display the previous screen. For example, the external device 20 may terminate the A/V content reproducing application 920 being currently executed, and display an execution screen of the browser application 820 having been previously executed. In this case, the electronic device 10 may terminate the web application 910 corresponding to the A/V content reproducing application 920. Also, the electronic device 10 may re-execute the browser control application (810 of FIG. 8) corresponding to the browser application 820 re-executed on the electronic device 10.

Figure 15:
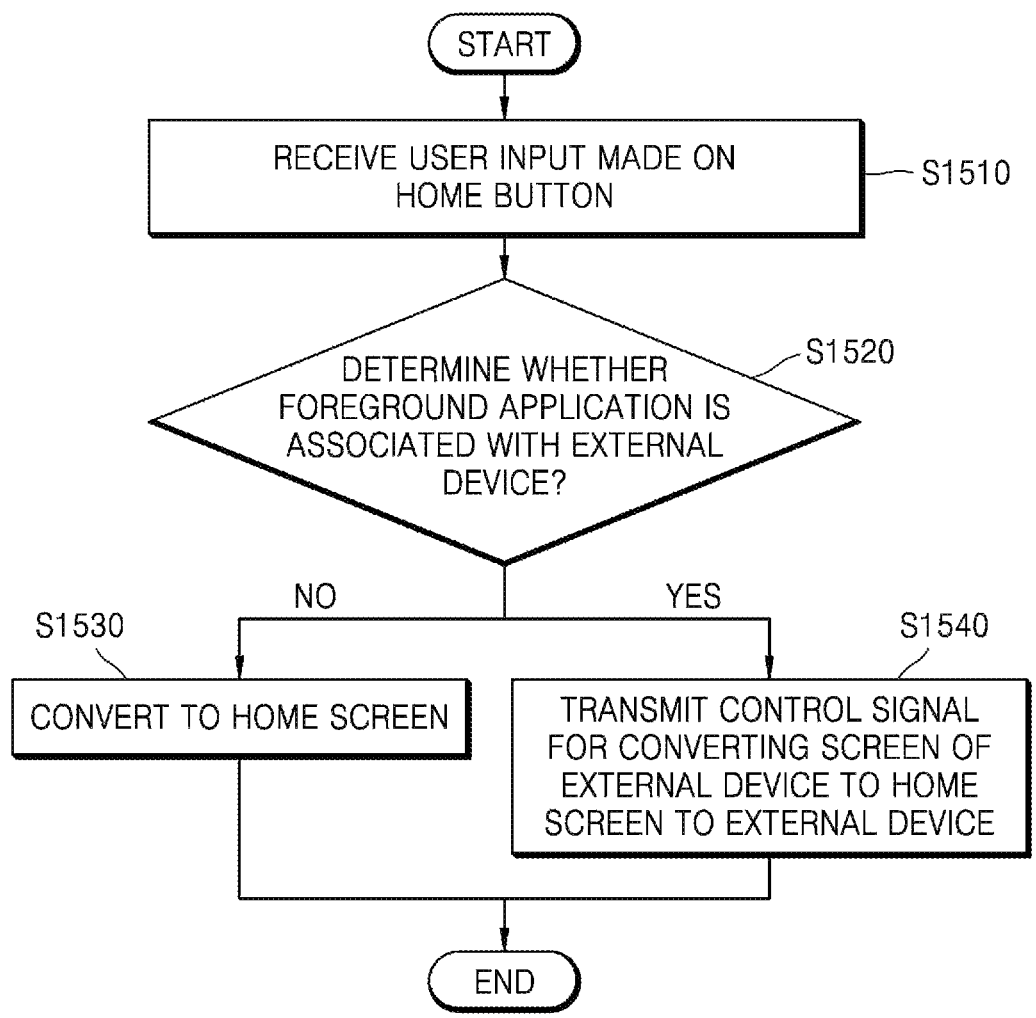
FIG. 15 is a flowchart for describing a method by which an electronic device provides an external device with a control signal corresponding to a UI provided for converting the screen of the electronic device to a home screen.

FIG. 15 is a flowchart for describing a method by which an electronic device provides an external device with a control signal corresponding to a UI provided for converting the screen of the electronic device to a home screen.

Referring to FIG. 15, in operation S1510, the electronic device 10 may receive a user input made on the home button 13 included in the electronic device 10.

In operation S1520, the electronic device 10 may determine whether a foreground application is associated with the external device 20. When the electronic device 10 determines that the foreground application is not associated with the electronic device 10, the electronic device 10 may convert the screen of the electronic device 10 to a home screen (or an initial screen) in response to the user input, in operation S1530.

When the electronic device 10 determines that the foreground application is associated with the external device 20, the electronic device 10 may transmit a control signal for converting the screen of the external device 20 to the home screen (or the initial screen) to the external device 20, in operation S1540. Also, the electronic device 10 may return to operation S1530 to convert the screen of the electronic device 10 to the home screen (or the initial screen).

Figure 16:
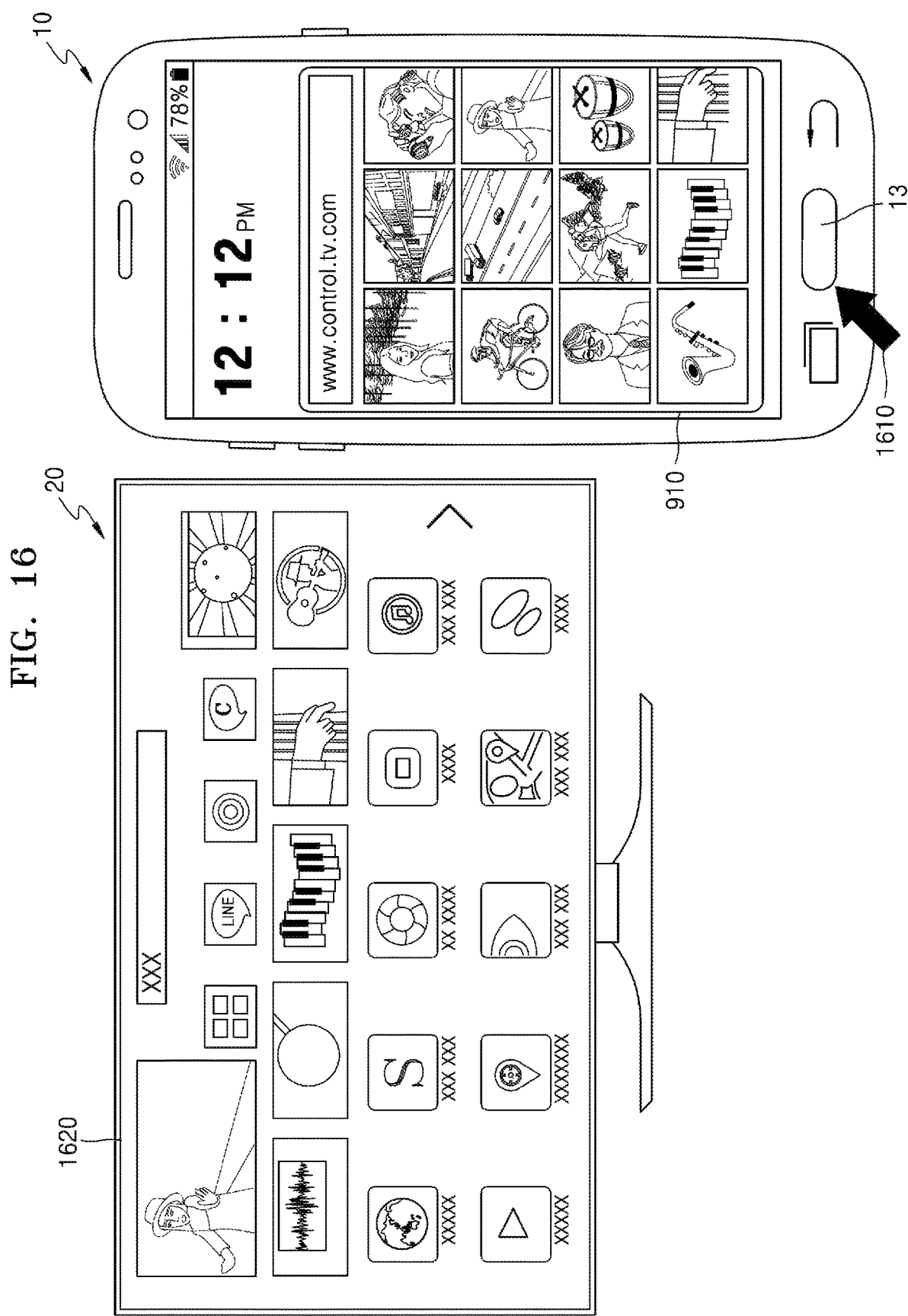
FIG. 16 shows an example in which an electronic device provides an external device with a control signal corresponding to a UI provided for converting the screen of the electronic device to a home screen.

FIG. 16 shows an example in which an electronic device provides an external device with a control signal corresponding to a UI provided for converting the screen of the electronic device to a home screen.

Referring to FIG. 16, when the electronic device 10 executes a web application 910 associated with the external device 20, the electronic device 10 may receive a user input 1610 made on the home button 13, and transmit a control signal corresponding to the user input 1610 to the external device 20.

The external device 20 may convert an execution screen (not shown) of an A/V content reproducing application to the home screen 1620, based on the received control signal. Also, the electronic device 10 may transmit the control signal to the external device 20, and then convert the screen of the electronic device 10 to the home screen (not shown).

Figure 17:
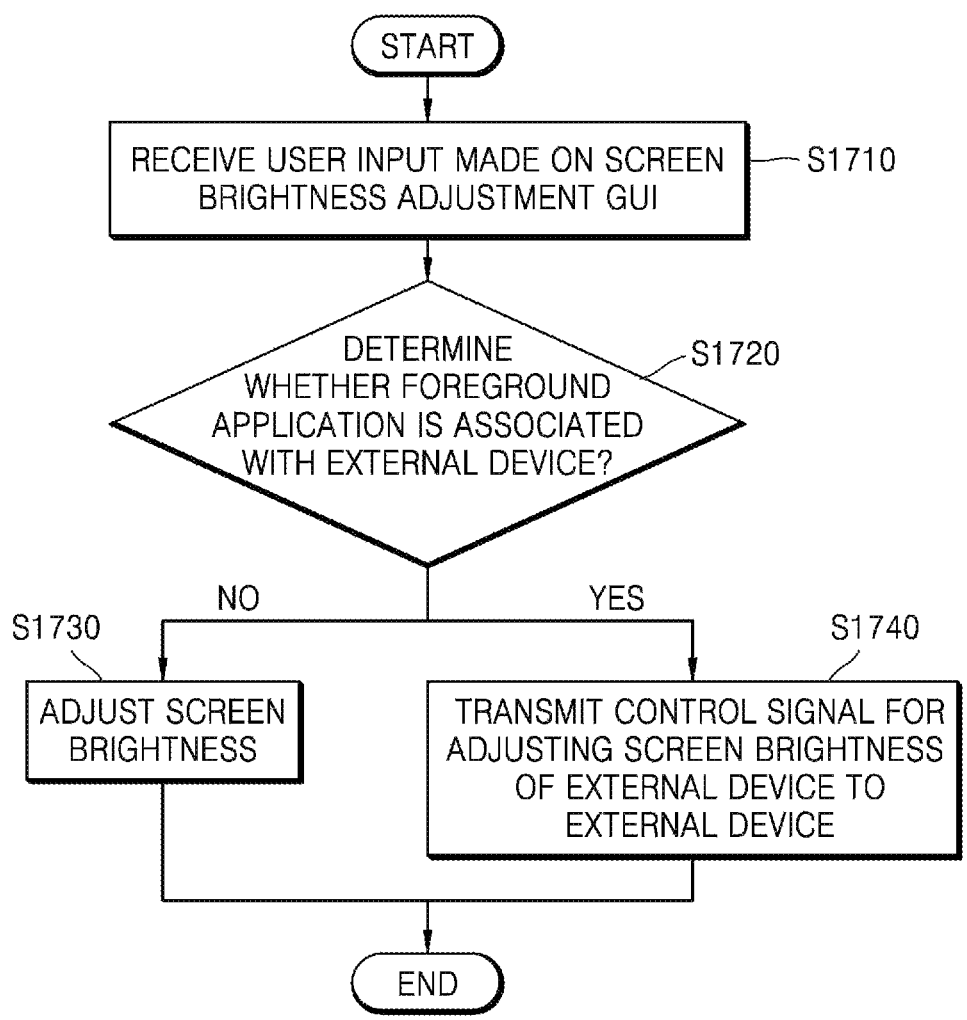
FIG. 17 is a flowchart for describing a method by which an electronic device provides an external device with a control signal corresponding to a UI provided for adjusting the screen brightness of the electronic device.

FIG. 17 is a flowchart for describing a method by which an electronic device provides an external device with a control signal corresponding to a UI provided for adjusting the screen brightness of the electronic device.

Referring to FIG. 17, in operation S1710, the electronic device 10 may receive a user input made on the screen brightness adjustment GUI 18 provided for quickly adjusting the screen brightness of the electronic device 10.

In operation S1720, the electronic device 10 may determine whether a foreground application is associated with the external device 20. When the electronic device 10 determines that the foreground application is not associated with the external device 20, the electronic device 10 may adjust the screen brightness of the electronic device 10 in response to the user input, in operation S1730.

When the electronic device 10 determines that the foreground application is associated with the external device 20, the electronic device 10 may transmit a control signal for adjusting the screen brightness of the external device 20 to the external device 20, in operation S1740.

Figure 18:
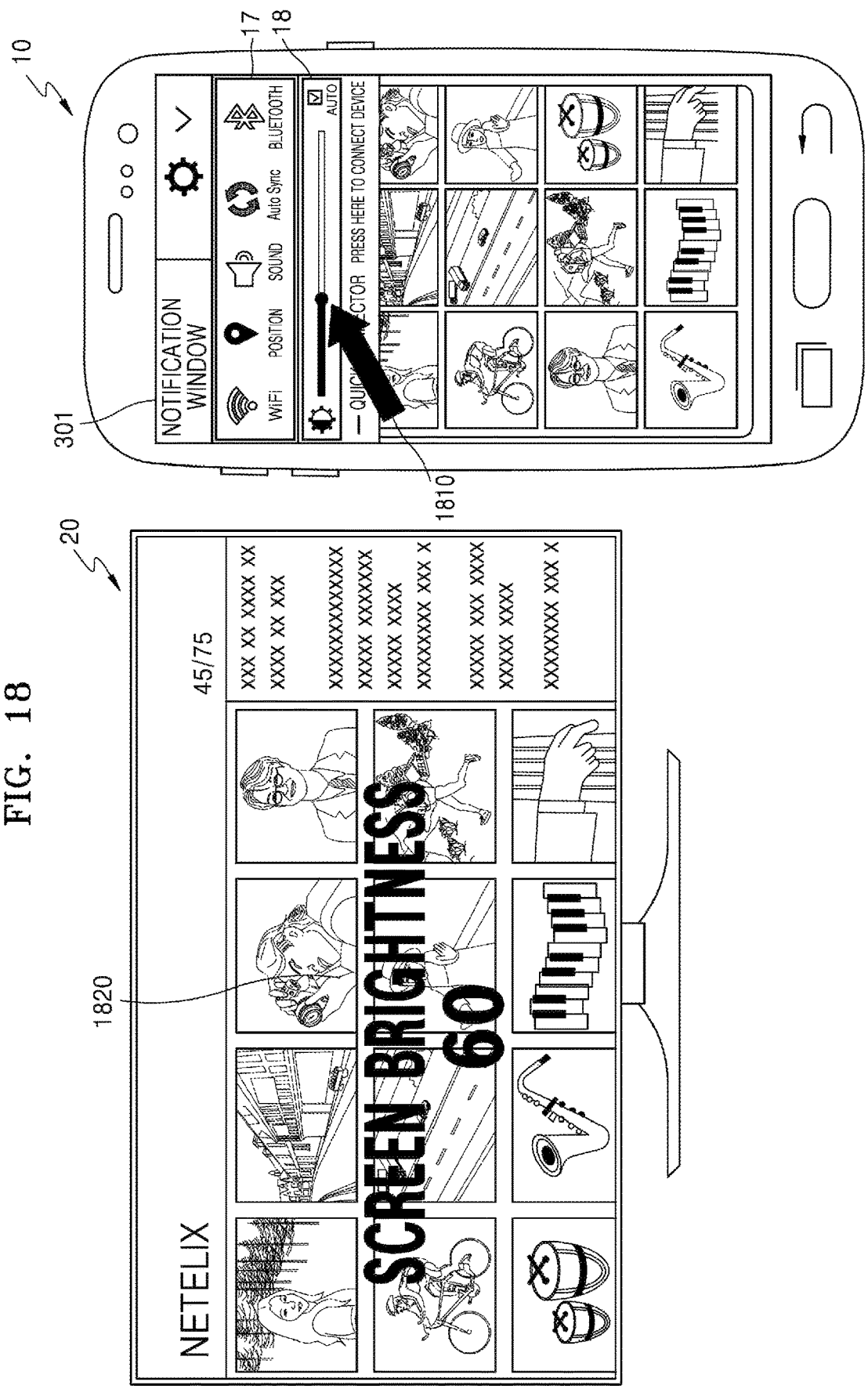
FIG. 18 shows an example in which an electronic device provides an external device with a control signal corresponding to a user input to a UI provided for adjusting the screen brightness of the electronic device.

FIG. 18 shows an example in which an electronic device provides an external device with a control signal corresponding to a UI provided for adjusting the screen brightness of the electronic device.

Referring to FIG. 18, the electronic device 10 may adjust the screen brightness of the external device 20, in response to a user input 1810 made on the screen brightness adjustment GUI 18 provided on the notification window 301 of the electronic device 10.

The external device 20 may adjust the screen brightness of the external device 20, based on control information received from the electronic device 10. Also, the external device 20 may display an image 1820 representing a current screen brightness that is adjusted by the electronic device 10.

Meanwhile, the electronic device 10 may provide a control signal for controlling a communication connection of the external device 20 to the external device 20, in response to a user input made on the communication connection GUI 17 for quickly controlling a communication connection (for example, a Bluetooth communication connection, a Wi-Fi communication connection, etc.) of the electronic device 10. In this case, the external device 20 may set or terminate a communication connection of the external device 20, based on the received control signal.

Figure 19:
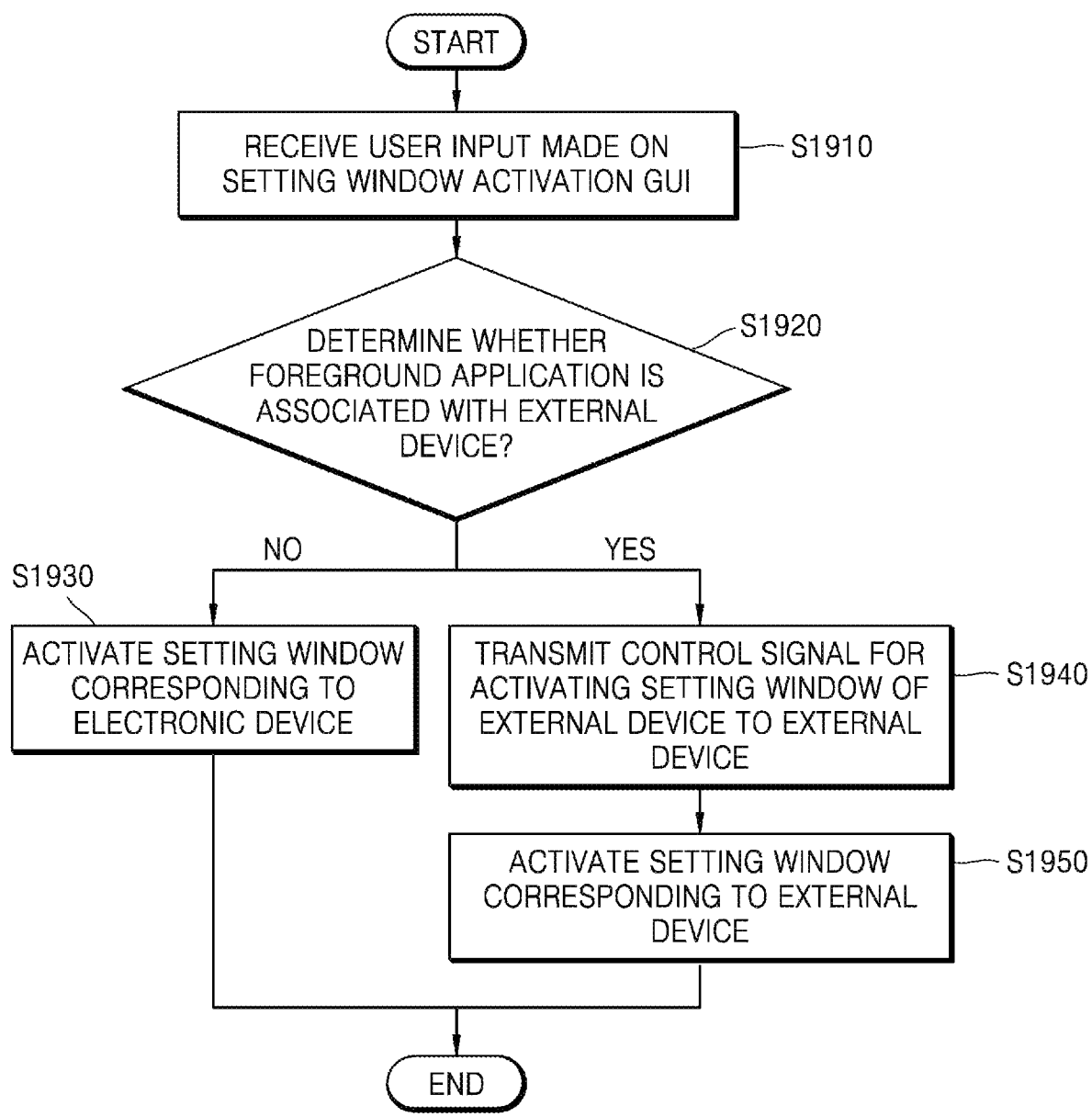
FIG. 19 is a flowchart for describing a method by which an electronic device provides an external device with a control signal corresponding to a UI provided for activating a setting window of the electronic device.

FIG. 19 is a flowchart for describing a method by which an electronic device provides an external device with a control signal corresponding to a UI provided for activating a setting window of the electronic device.

Referring to FIG. 19, in operation S1910, the electronic device 10 may receive a user input made on the setting window activation GUI 18 provided for quickly activating a setting window of the electronic device 10.

In operation S1920, the electronic device 10 may determine whether a foreground application is associated with the external device 20. When the electronic device 10 determines that the foreground application is not associated with the external device 20, the electronic device 10 may activate a setting window corresponding to the electronic device 10 in response to the user input, in operation S1930.

According to an embodiment, the setting window may include a plurality of pages for enabling a user to change settings of the electronic device 10 and settings of the external device 20. Accordingly, the setting window corresponding to the electronic device 10 may be at least one page for enabling a user to change settings of the electronic device 10 among a plurality of pages. The electronic device 10 may create each page based on configuration information received from the external device 20.

When the electronic device 10 determines that the foreground application is associated with the external device 20, the electronic device 10 may transmit a control signal for converting the screen of the external device 20 to a setting window screen to the external device 20, in operation S1940. Also, in operation S1950, the electronic device 10 may activate a setting window corresponding to the external device 20. Herein, the setting window corresponding to the external device 20 may be at least one page for enabling a user to change settings of the external device 20 among a plurality of pages.

FIG. 20 shows an example in which an electronic device provides an external device with a control signal corresponding to a UI provided for activating a setting window.

Referring to FIG. 20, the electronic device 10 may convert the screen of the external device 20 to a setting window screen 2020, in response to a user input 2010 made on the setting window activation GUI 16 provided on the notification window 301 of the electronic device 10.

Also, the electronic device 10 may activate a setting window 2040 of the electronic device 10, as shown in the right area of FIG. 20. At this time, the electronic device 10 may activate a page 2041 for enabling a user to change settings of the external device 20 among a plurality of pages included in the setting window 2040 of the electronic device 10. The page 2041 for enabling the user to change the settings of the external device 20 may include the same items as the setting window 2020 activated on the external device 20 or items similar to those included in the setting window 2020.

Figure 21:
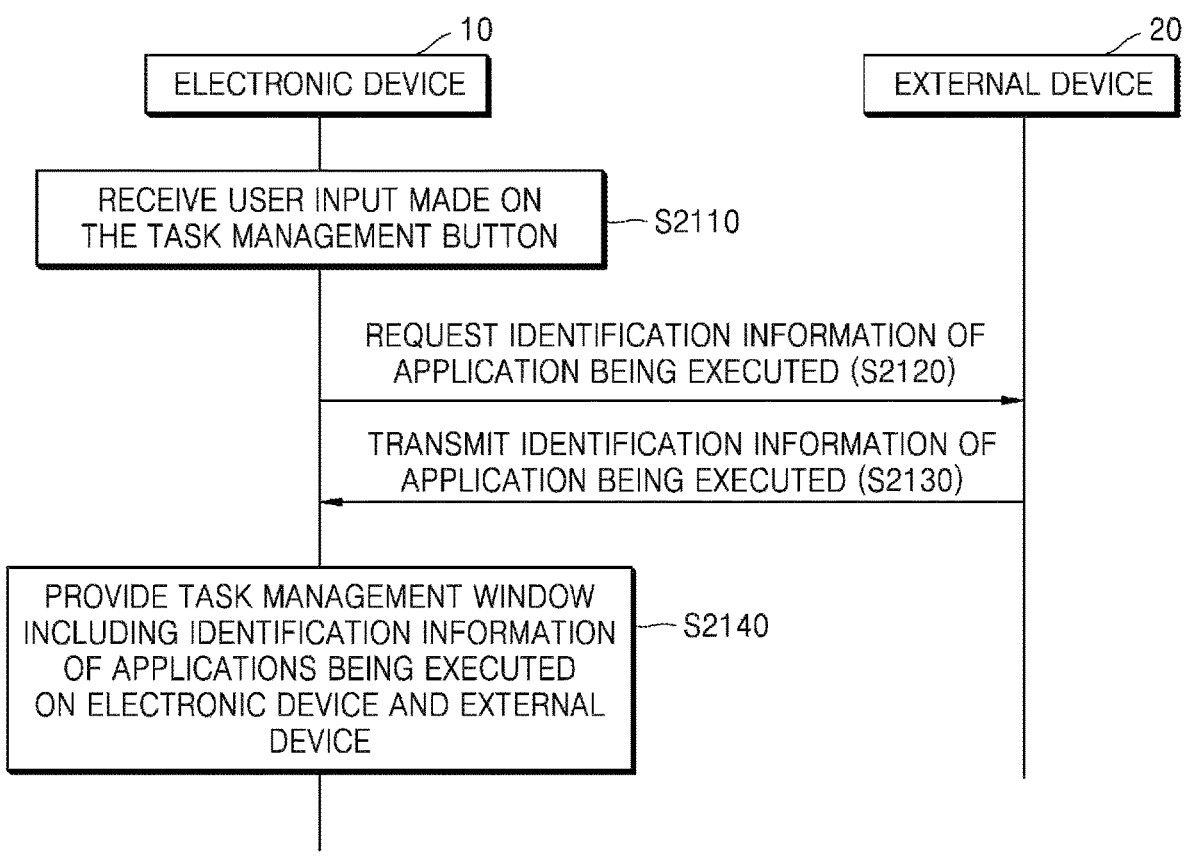
FIG. 21 is a flowchart for describing a method by which an electronic device performs a task management function.

FIG. 21 is a flowchart for describing a method by which an electronic device performs a task management function.

Referring to FIG. 21, in operation S2110, the electronic device 10 may receive a user input made on the task management button 14.

In operation S2120, the electronic device 10 may request the external device 20 to send identification information of an application being executed on the external device 20. Also, in operation S2130, the electronic device 10 may receive identification information of an application being executed on the external device 20.

In operation S2140, the electronic device 10 may provide a task management window including identification information of applications being executed on the electronic device 10 and the external device 20. Herein, the task management window may convert a background application of the electronic device 10 or the external device 20 to a foreground application, or provide a GUI for terminating an application being executed on the electronic device 10 or the external device 20.

For example, the electronic device 10 may receive a user input for terminating at least one application being executed on the external device 20 through the task management window. Also, the electronic device 10 may transmit an application termination signal to the external device 20 in response to the received user input.

Figure 22A:
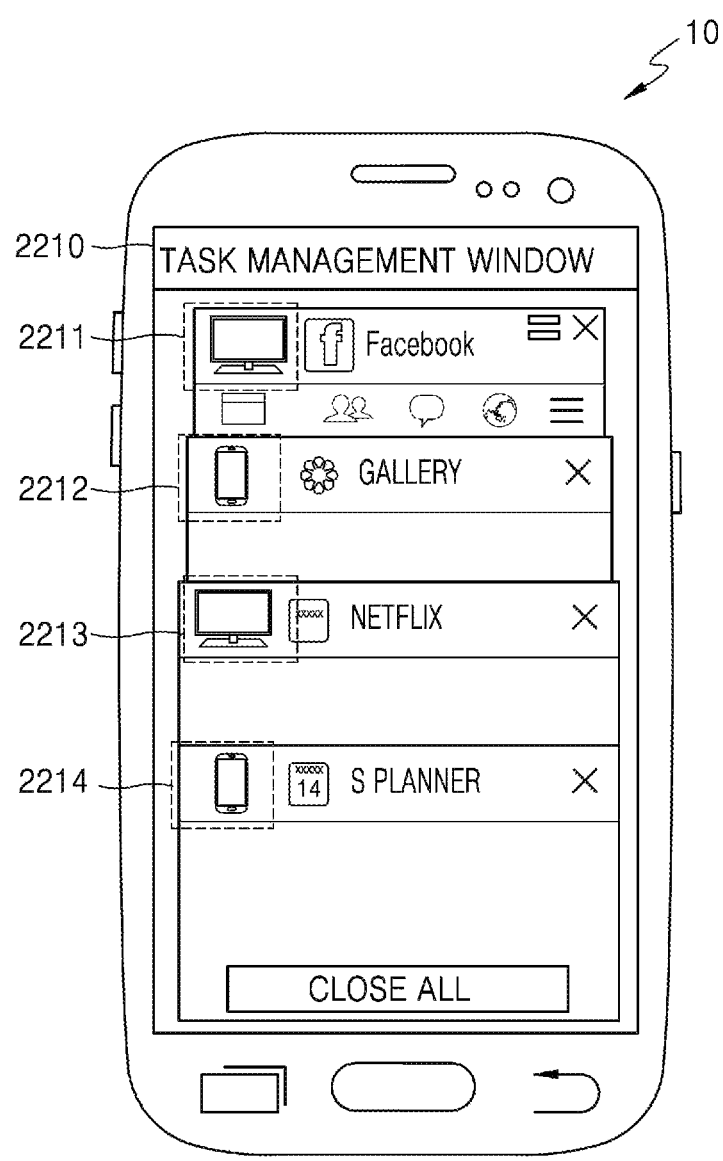
FIGS. 22A and 22B show an example of a task management window provided by an electronic device.
Figure 22B:
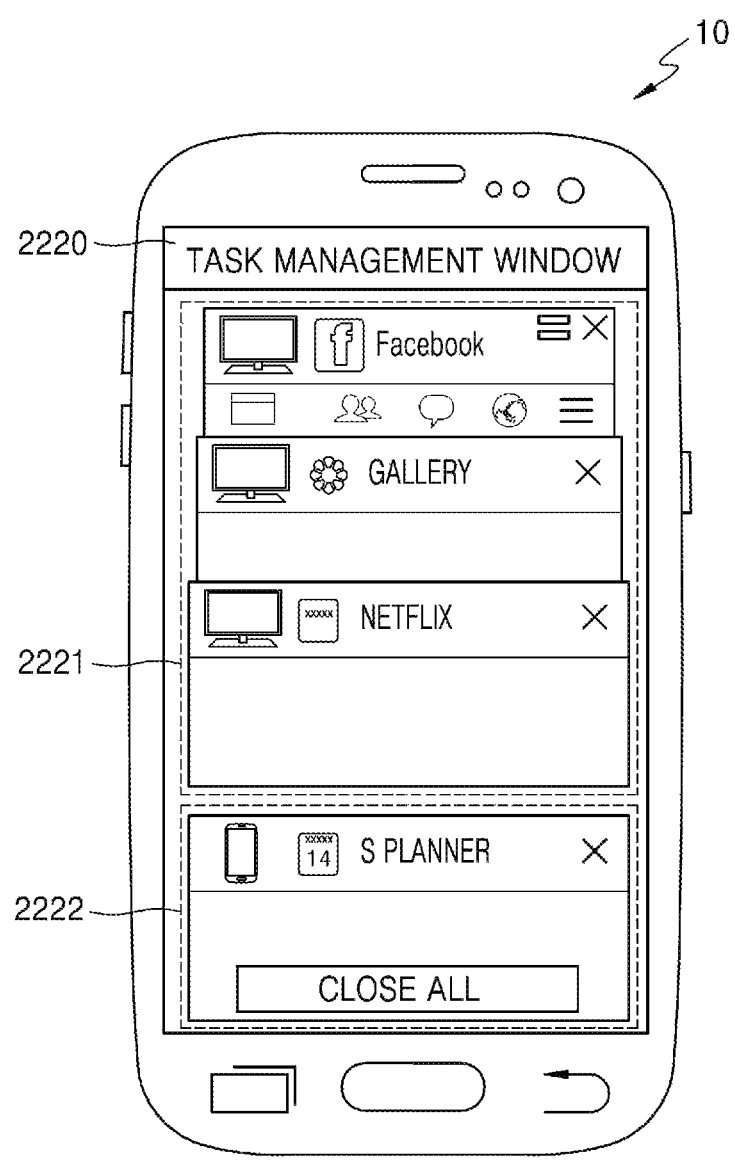

FIGS. 22A and 22B show an example of a task management window provided by an electronic device.

Referring to FIG. 22A, the electronic device 10 may provide a task management window 2210 including identification information of applications being executed on the electronic device 10 and the external device 20. Meanwhile, the electronic device 10 may provide images 2211 and 2214 representing devices on which the respective applications are executed. Accordingly, the user may intuitively recognize the devices on which the applications are executed.

Referring to FIG. 22B, a task management window 2220 provided by the electronic device 10 may display identification information of applications which individual devices execute. For example, the electronic device 10 may divide the task management window 2220 to distinctively display identification information 2222 of an application being executed on the electronic device 10 and identification information 2221 of an application being executed on the external device 20.

Figure 23:
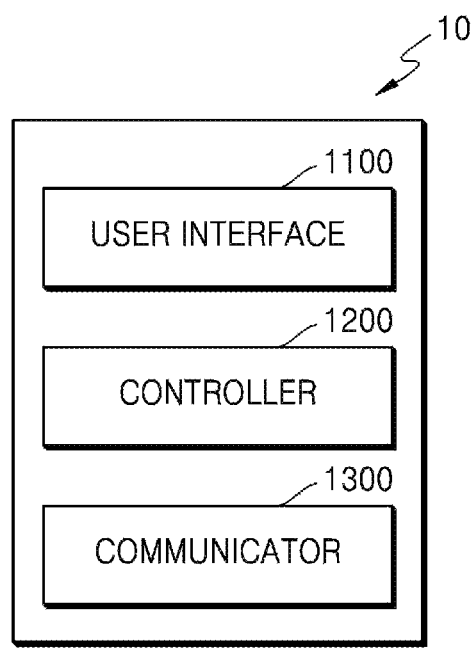
FIGS. 23 and 24 show configurations of an electronic device according to an embodiment.
Figure 24:
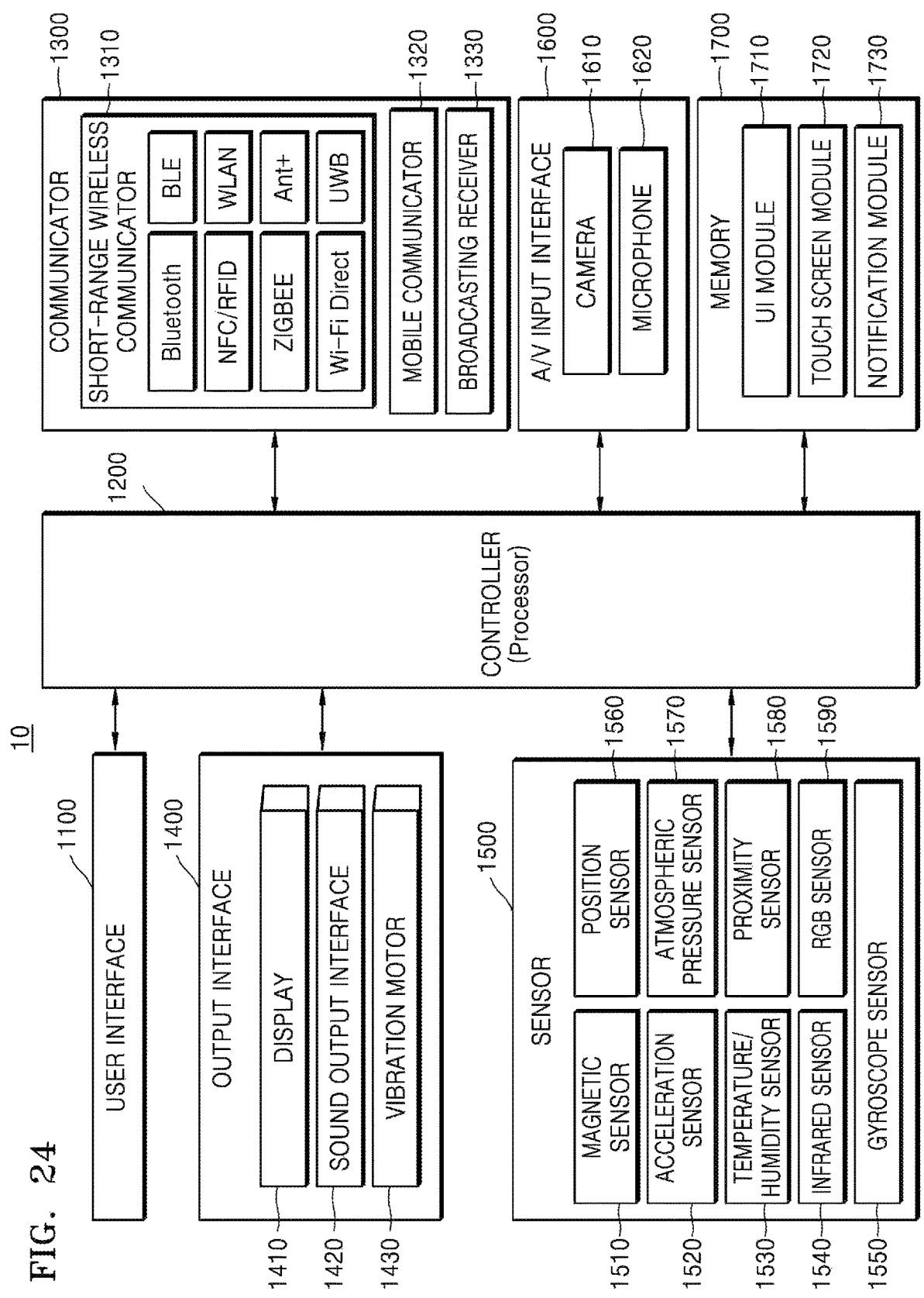

FIGS. 23 and 24 show configurations of an electronic device according to an embodiment. Operations of the configurations shown in FIGS. 23 and 24 relate to the embodiments described above with reference to FIGS. 1 to 22. Accordingly, descriptions given above with reference to FIGS. 1 to 22 may be applied to the operations of the configurations shown in FIGS. 23 and 24.

As shown in FIG. 23, the electronic device 10 according to an embodiment may include a user interface 1100, a controller 1200, and a communicator 1300. However, all components shown in FIG. 23 are not the necessary components of the electronic device 10. The electronic device 10 may be implemented with a larger or smaller number of components than those shown in FIG. 23.

For example, as shown in FIG. 24, the electronic device 10 according to an embodiment may further include an output interface 1400, a sensor 1500, an A/V input interface 1600, and a memory 1700, in addition to the user interface 1100, the controller 1200, and the communicator 1300.

The user interface 1100 may be means for enabling a user to input data for controlling the electronic device 10.

According to an embodiment, the user interface 1100 may include an UI provided for controlling the electronic device 10, and an UI provided for controlling an application being executed on the electronic device 10. The UI provided for controlling the electronic device 10 may include, for example, an UI for enabling a user to intuitively control the functions of the electronic device 10, such as volume adjustment, screen brightness adjustment, screen conversion, task management, a communication connection, etc.

Also, the UI provided for controlling the electronic device 10 may include at least one button or at least one GUI included in the electronic device 10. The at least one GUI may be means for enabling a user to input data using a touch pad (a contact capacitive type, a pressure resistive type, an infrared sensing type, a surface acoustic wave type, an integral strain gauge type, a piezo effect type, etc.). Also, the user interface 1100 may further include a dome switch, a jog wheel, etc.

The user interface 1100 may receive a user input made on the UI provided for controlling the electronic device 10, and provide the received user input to the controller 1200. Meanwhile, the user input may be press, continuous press, long press, tap, touch & hold, double tap, drag, panning, flick, drag & drop, swipe, etc.

The controller 1200 may generally control overall operations of the electronic device 10. For example, the controller 1200 may execute programs stored in the memory 1700 to control overall operations of the user interface 1100, the communicator 1300, the output interface 1400, the sensor 1500, the A/V input interface 1600, etc. The controller 1200 may control overall operations of the user interface 1100, the communicator 1300, the output interface 1400, the sensor 1500, the A/V input interface 1600, etc., in order to perform operations of the electronic device 10 described above with reference to FIGS. 1 to 22.

More specifically, when the controller 1200 receives a user input through the user interface 1100, the controller 1200 may determine whether a foreground application is associated with the external device 20. For example, the controller 1200 may determine whether a foreground application is associated with the external device 20, based on identification information of an application being executed on the external device 20 and received from the external device 20. Or, the controller 1200 may receive information about applications installed in the external device 20 in advance, and determine whether a foreground application matches with the information about the applications received in advance. Herein, the information about the applications installed in the external device 20 may include identification information of the applications installed in the external device 20 and execution information of a control application provided by the electronic device 10 for controlling the applications installed in the external device 20. Also, the execution information of the control application may include URL information, an application installation file, a widget execution file, etc. Accordingly, the controller 1200 may determine whether a foreground application is associated with the external device 20, based on whether the foreground application matches with the execution information of the control application. Meanwhile, the controller 1200 may store the information about the applications installed in the external device 20 in the memory 1600.

According to an embodiment, when the controller 1200 determines that the foreground application is associated with the external device 20, the controller 1200 may generate a control signal corresponding to a user input received through the user interface 1100, instead of performing an operation corresponding to the user input. For example, the controller 1200 may generate a control signal corresponding to a user input for performing an operation, such as volume adjustment, screen brightness adjustment, a communication connection, etc.

Or, when the controller 1200 determines that the foreground application is associated with the external device 20, the controller 1200 may generate a control signal corresponding to a user input received through the user interface 1100, while performing an operation corresponding to the user input. For example, the controller 1200 may generate a control signal corresponding to a user input for performing an operation, such as setting window activation, screen conversion, etc., and perform the operation of activating a setting window or converting the screen. Also, the controller 1200 may provide the generated control signal to the communicator 1300.

According to an embodiment, the controller 1200 may provide an application list based on application identification information received from the external device 20. Also, when an application is selected from the application list, the controller 1200 may provide a control signal for executing the selected application to the communicator 1300, and execute a control application corresponding to the selected application.

Also, the controller 1200 may create a task management window including identification information of applications being executed on the external device 20, in response to a user input for executing a task management function. At this time, the identification information of the applications being executed on the external device 20 may be provided from the communicator 1300.

The communicator 1300 may include at least one component for enabling the electronic device 10 to communicate with at least one external device 20. For example, the communicator 1300 may include at least one of a short-range wireless communicator 1310, a mobile communicator 1320, and a broadcasting receiver 1330.

The short-range wireless communicator 1310 may include a Bluetooth communicator, a Bluetooth Low Energy (BLE) communicator, a Near Field Communication (NFC) communicator, a WLAN (Wi-Fi) communicator, a Zigbee communicator, an Infrared Data Association (IrDA) communicator, a Wi-Fi Direct (WFD) communicator, a Ultra Wideband (UWB) communicator, an Ant+ communicator, etc., although not limited to these.

The mobile communicator 1320 may receive/transmit a wireless signal from/to at least one of a base station, an external terminal, and a server on a mobile communication network. The broadcasting receiver 1330 may receive a broadcasting signal and/or broadcasting-related information from the outside through a broadcasting channel. The broadcasting channel may include a satellite channel and a terrestrial channel.

According to an embodiment, the communicator 1300 may receive information about applications installed in the external device 20. For example, the communicator 1300 may receive information about applications installed in the external device 20 at regular time intervals or at a predetermined time.

Also, the communicator 1300 may transmit a control signal for controlling the external device 20 to the external device 20. For example, the communicator 1300 may transmit a control signal instructing volume adjustment, screen brightness adjustment, screen conversion, setting window activation, channel change, a communication connection, application execution, and application termination, etc., to the external device 20. Meanwhile, according to an embodiment, the communicator 1300 may transmit the control signal to the external device 20 through an external server, a router, etc.

Also, the communicator 1300 may receive identification information of at least one application being executed on the external device 20. Also, the communicator 1300 may receive an event from the external device 20.

The output interface 1400 may output an audio signal, a video signal, or a vibration signal. The output interface 1400 may include a display 1410, a sound output interface 1420, and a vibration motor 1430.

The display 1410 may display and output information processed on the electronic device 10. For example, the display 1410 may display an application list including identification information of applications installed in the electronic device 10 or the external device 20. For example, the display 1410 may distinctively display an application list including identification information of applications installed in the electronic device 10 and an application list including identification information of applications installed in the external device 20. More specifically, the display 1410 may display different folders or images including the respective application lists.

Also, the display 1410 may display an execution window of an application, a notification window, a widget, a setting window, a home screen, a task management window, a notification bar, etc. under the control of the controller 1200.

Also, the display 1410 may be coupled with the user interface 1100 to display a GUI provided for controlling the electronic device 10. For example, the display 1410 and a touch pad may form a layered structure to be configured as a touch screen.

Meanwhile, the display 1410 may include at least one of a liquid crystal display, a thin film transistor-liquid crystal display, an organic light-emitting diode, a flexible display, a 3D display, and an electrophoretic display. Also, the electronic device 10 may include two or more displays 1410 according to its implementation form. The two or more displays 1410 may be opposite to each other by a hinge.

The sound output interface 1420 may output audio data received from the communicator 1300 or stored in the memory 1700. The vibration motor 1430 may output a vibration signal.

The sensor 1500 may sense a state of the electronic device 10 or a state of the surroundings of the electronic device 10, and transfer the result of the sensing to the controller 1200. For example, the sensor 1500 may include at least one of a magnetic sensor 1510, an acceleration sensor 1520, a temperature/humidity sensor 1530, an infrared sensor 1540, a gyroscope sensor 1550, a position sensor (for example, Global Positioning System (GPS)) 1560, an atmospheric pressure sensor 1570, a proximity sensor 1580, and an RGB sensor (illuminance sensor) 1590, although not limited to these.

The A/V input interface 1600 may include a camera 1610 and a microphone 1620 for enabling a user to input audio signals or video signals.

The camera 1610 may obtain image frames, such as still images or moving images, through an image sensor in a video call mode or a photographing mode. Also, the microphone 1620 may receive sound signals from the outside, and process the sound signals as electrical voice data.

The memory 1700 may store programs for processing and controlling the controller 1200, and store data input to or output from the electronic device 10.

The memory 1700 may include at least one type of storage medium among a flash memory type, a hard disk type, a multimedia card micro type, card type memory (for example, Secure Digital (SD) or eXtreme Digital (XD) memory), Random Access Memory (RAM), Static Random Access Memory (SRAM), Read-Only Memory (ROM), Electrically Erasable Programmable Read-Only Memory (EEPROM), Programmable Read-Only Memory (PROM), magnetic memory, a magnetic disk, and an optical disk.

Programs stored in the memory 1700 may be classified into a plurality of modules according to their functions. For example, the programs stored in the memory 1700 may be classified into a UI module 1710, a touch screen module 1720, a notification module 1730, etc.

The UI module 1710 may support a UI, etc. provided for controlling the electronic device 10 or a UI, etc. provided for providing applications. The touch screen module 1720 may sense a user's touch gesture made on the touch screen, and support information related to touch gestures. According to an embodiment, the touch screen module 1720 may recognize a touch code, and analyze it. The touch screen module 1720 may be configured as separate hardware including a controller.

The notification module 1730 may generate a signal for notifying the generation of an event of the electronic device 10. The notification module 1730 may output a notification signal in the form of a video signal through the display 1410, in the form of an audio signal through the sound output interface 1420, or in the form of a vibration signal through the vibration motor 1430.

The disclosed embodiments may be implemented in the form of a recording medium including instructions executable by a computer, such as a program module executed by a computer. A computer-readable medium may be an arbitrary available medium that may be accessed by a computer, and include all of volatile and non-volatile media and separable and non-separable media. Also, the computer-readable medium may include a computer storage medium and a communication medium. The computer storage medium may include all of volatile and non-volatile media and separable or non-separable media implemented with an arbitrary method or technique in order to store information, such as a computer-readable instruction, a data structure, a program module, or other data. The communication medium may include a computer-readable instruction, a data structure, a program module, other data of modulated data signals such as carrier waves, or other transmission mechanism, and include an arbitrary information transfer medium.

The aforementioned descriptions are only for illustrative purposes, and it will be apparent that those of skill in the art can make various modifications thereto without changing the technical spirit and essential features of the present disclosure. Thus, it should be understood that the embodiments described above are merely for illustrative purposes and not for limitation purposes in all aspects. For example, each component described as a single type can be implemented in a distributed type, and components described as distributed can be implemented in a combined form.

The scope of the present disclosure would be defined by claims that will be described below, rather than the detailed description, and all changes or modifications derived from the meaning, scope, and equivalent concept of the claims should be interpreted to be included in the scope of the present disclosure.

The invention claimed is:

1. An operation method of an electronic device comprising:
receiving, by the electronic device, a user input via at least one of a hard key or a soft key provided for controlling at least one function of the electronic device;
determining, by the electronic device, whether information about a foreground application matches information about a control application associated with an external device;
based on determining that the information about the foreground application matches the information about the control application associated with the external device, transmitting, by the electronic device, a control signal corresponding to the user input via the at least one of the hard key or the soft key to the external device;
receiving an update event of the control application associated with the external device from the external device;
displaying the update event of the control application on a notification window of the electronic device; and
displaying a task management window including identification information of at least one application being executed on the external device and identification information of at least one application being executed on the electronic device,
wherein the update event comprises at least one of a preset notification event or an update event of one or more applications installed in the external device.

2. The operation method of claim 1, wherein the determining of whether the information about the foreground application matches the information about the control application comprises:
receiving, from the external device, identification information of the one or more applications installed in the external device and execution information of the control application for controlling the one or more applications installed in the external device; and
based on the foreground application matching with the execution information of the control application, determining that the information about the foreground application matches the information about the control application associated with the external device.

3. The operation method of claim 1, wherein the foreground application is provided based on an application installation file received from the external device.

4. The operation method of claim 1, wherein the foreground application is provided based on Uniform Resource Locator (URL) information received from the external device.

5. The operation method of claim 1, wherein the foreground application is executed according to a user input of selecting an application from an application list displayed on a screen of the electronic device, and the application list displayed on the screen of the electronic device includes a first application list of one or more applications installed in the electronic device and a second application list of the one or more applications installed in the external device, and the first application list and the second application list are displayed distinctively simultaneously on the screen of the electronic device, and
the second application list includes identification information of the one or more applications installed in the external device.

6. The operation method of claim 1, wherein the foreground application is a widget including at least one of state information of the external device or information about the at least one application being executed on the external device.

7. The operation method of claim 1, wherein the hard key or the soft key is provided to control the at least one application being executed on the electronic device,
wherein the operation method further comprises:
receiving the identification information of the at least one application being executed on the external device.

8. An electronic device comprising:
a communication interface configured to communicate with an external device; and
a processor configured to:
receive a user input via at least one of a hard key or a soft key provided for controlling at least one function of the electronic device;
determine whether information about a foreground application matches information about a control application associated with the external device;
based on determining that the information about the foreground application matches the information about the control application associated with the external device, control the communication interface to transmit a control signal corresponding to the user input via the at least one of the hard key or the soft key to the external device;
receive an update event of the control application associated with the external device from the external device; and
display the event of the control application on a notification window of the electronic device, and
display a task management window including identification information of at least one application being executed on the external device and identification information of at least one application being executed on the electronic device,
wherein the update event comprises at least one of a preset notification event or an update event of one or more application installed in the external device.

9. The electronic device of claim 8, wherein the processor is further configured to:
receive, from the external device via the communication interface, identification information of one or more application installed in the external device and execution information of the control application for controlling the one or more application installed in the external device, and based on the information about the foreground application matching with the execution information of the control application, determine that the information about the foreground application matches the information about the control application associated with the external device.

10. The electronic device of claim 8, wherein the foreground application is provided based on Uniform Resource Locator (URL) information or an application installation file received from the external device.

11. The electronic device of claim 8, wherein the foreground application is executed according to a user input of selecting an application from an application list displayed on a screen of the electronic device, and the application list displayed on the screen of the electronic device includes a first application list of one or more applications installed in the electronic device and a second application list of the one or more applications installed in the external device, and the first application list and the second application list are displayed distinctively simultaneously on the screen of the electronic device, and the second application list includes identification information of the one or more applications installed in the external device.

12. The electronic device of claim 8, wherein the hard key or the soft key is provided to control the at least one application being executed on the electronic device, wherein the processor is further configured to:

receives the identification information of at least one application being executed on the external device.

13. A computer program product comprising a non-transitory computer readable storage medium having program code stored thereon, the program code being executable by a processor to perform a method of an electronic device for controlling an external device, the method comprising:

receiving, by the electronic device, a user input via at least one of a hard key or a soft key provided for controlling at least one function of the electronic device;

determining whether information about a foreground application matches information about a control application associated with the external device;

based on determining that the information about the foreground application matches the information about the control application associated with the external device, transmitting a control signal corresponding to the user input via the at least one of the hard key or the soft key to the external device;

receiving an update event of the control application associated with the external device from the external device;

displaying the update event of the control application on a notification window of the electronic device; and displaying a task management window including identification information of at least one application being executed on the external device and identification information of at least one application being executed on the electronic device, wherein the update event comprises at least one of a preset notification event on an update event of one or more application installed in the external device.

14. The computer program product of claim 13, wherein the determining whether the information about the foreground application matches the information about the control application comprises:

receiving, from the external device, identification information of the one or more application installed in the external device and execution information of the control application for controlling the one or more applications installed in the external device; and based on the information about the foreground application matching with the execution information of the control application, determining that the information about the foreground application matches the information about the control application.

15. The computer program product of claim 13, wherein the foreground application is provided based on an application installation file received from the external device, or based on Uniform Resource Locator (URL) information received from the external device.

16. The computer program product of claim 13, wherein the user input corresponds to one of: volume adjustment, screen brightness adjustment, a communication connection adjustment, a setting window activation, or a screen conversion.

17. The computer program product of claim 13, wherein the foreground application is executed according to a user input of selecting an application from an application list displayed on a screen of the electronic device, and the application list displayed on the screen of the electronic device includes a first application list of one or more applications installed in the electronic device and a second application list of the one or more applications installed in the external device, and the first application list and the second application list are displayed distinctively simultaneously on the screen of the electronic device, and the second application list includes identification information of the one or more applications installed in the external device.

* * * * *